US011303331B2

(12) United States Patent
Zhu et al.

(10) Patent No.: US 11,303,331 B2
(45) Date of Patent: *Apr. 12, 2022

(54) COMMUNICATION DEVICE AND METHOD USED FOR MULTIUSER SPATIAL MODULATION

(71) Applicant: Sony Corporation, Tokyo (JP)

(72) Inventors: Xudong Zhu, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/159,195

(22) Filed: Jan. 27, 2021

(65) Prior Publication Data
US 2021/0152223 A1 May 20, 2021

Related U.S. Application Data

(60) Continuation of application No. 16/714,836, filed on Dec. 16, 2019, now abandoned, which is a division of
(Continued)

(30) Foreign Application Priority Data

Oct. 25, 2016 (CN) .......................... 201610934492.0

(51) Int. Cl.
H04B 7/0452 (2017.01)
H04L 1/06 (2006.01)
(Continued)

(52) U.S. Cl.
CPC ......... H04B 7/0452 (2013.01); H04B 7/0426 (2013.01); H04B 7/0697 (2013.01);
(Continued)

(58) Field of Classification Search
CPC .. H04B 7/0452; H04B 7/0426; H04B 7/0697; H04L 1/06; H04W 52/04; H04W 28/02
See application file for complete search history.

(56) References Cited

U.S. PATENT DOCUMENTS 10,756,789 B2 * 8/2020 Zhu ........................ H04L 1/06
2008/0037673 A1 2/2008 Ahn et al.
(Continued)

FOREIGN PATENT DOCUMENTS

CN 101527699 A 9/2009
CN 102710394 A 10/2012
CN 104639221 A 5/2015

OTHER PUBLICATIONS

Wu, Xiping. "Wireless Communication Systems Based on Spatial Modulation MIMO". Thesis. University of Edinburgh. May 2015. https://era.ed.ac.uk/handle/1842/10505 Accessible May 28, 2015. (Year: 2015).*

(Continued)

Primary Examiner — David S Huang
(74) Attorney, Agent, or Firm — Xsensus, LLP

(57) ABSTRACT

A communication device includes a processing circuit, the processing circuit being configured as: mapping a first information bit part used for a receiving end to a corresponding channel based on a pre-set mapping rule so as to execute spatial modulation with respect to the first information bit part of the receiving end; allocating a transmission power to the receiving end; and controlling the transmission power allocated through a mapped channel to transmit a second information bit part used for the receiving end. In the case of the first information bit parts used for multiple receiving ends being the same, the channels mapped for multiple receiving ends are the same. The multi-user spatial modulation performs spatial modulation for multiple receiving ends at the same time through a multiplexing channel of (Continued)

the transmitting end, improving the additional modulation order and the data transmission rate which can be obtained by each receiving end.

10 Claims, 22 Drawing Sheets

Related U.S. Application Data application No. 16/323,588, filed as application No. PCT/CN2017/106971 on Oct. 20, 2017, now Pat. No. 10,756,789.

(51) Int. Cl.
    *H04W 28/02*     (2009.01)
    *H04W 52/04*     (2009.01)
    *H04B 7/06*     (2006.01)
    *H04B 7/0426*     (2017.01)

(52) U.S. Cl.
    CPC ............... *H04L 1/06* (2013.01); *H04W 28/02* (2013.01); *H04W 52/04* (2013.01)

(56) References Cited

U.S. PATENT DOCUMENTS

| | | |
|---|---|---|
| 2014/0078961 A1 | 3/2014 | Shen et al. |
| 2016/0164581 A1 | 6/2016 | Kim |
| 2017/0005846 A1 | 1/2017 | Mohamed |
| 2019/0181928 A1 | 6/2019 | Pan et al. |

OTHER PUBLICATIONS

Sandeep Narayanan, et al, "Multi-User Spatial Modulation MIMO", 2014, IEEE Wireless Communications and Networking Conference(WCNC) pp. 671-676. IEEE WCNC'14 Track 1 (PHY and Fundamentals).

Narayanan et al., "Multi-user spatial modulation MIMO", IEEE Wireless Communications and Networking Conference (WCNC), Apr. 6-9, 2014, Istanbul, Turkey, 1 page (Abstract Only).

International Search Report dated Dec. 26, 2017 for PCT/CN2017/106971 filed on Oct. 20, 2017, 9 pages including English Translation.

* cited by examiner

| Information bits | sequence number of antenna |
|---|---|
| 00 | 1 |
| 01 | 2 |
| 10 | 3 |
| 11 | 4 |

FIG. 8

COMMUNICATION DEVICE AND METHOD USED FOR MULTIUSER SPATIAL MODULATION

CROSS-REFERENCE TO RELATED APPLICATIONS

This application is a continuation of U.S. application Ser. No. 16/714,836, filed Dec. 16, 2019, which is a divisional of U.S. application Ser. No. 16/323,588, filed Feb. 6, 2019 (now U.S. Pat. No. 10,756,789), which is based on PCT filing PCT/CN2017/106971, filed Oct. 20, 2017, which claims priority to CN 201610934492.0, filed Oct. 25, 2016, the entire contents of each are incorporated herein by reference.

TECHNICAL FIELD

The present disclosure generally relates to transmission techniques in wireless communications, and more particularly to multi-user spatial modulation techniques in wireless communications.

BACKGROUND ART

Multiple-Input Multiple-Output (MIMO) transmission systems can provide multiplexing gain, diversity gain, and antenna gain. Therefore, the technology of MIMO has been applied in many recent communication standards, such as IEEE 402.11n, IEEE 402.16, and 3GPP Long-Term Evolution (LTE). However, there exist bottlenecks in the technology of MIMO in terms of higher complexity and increased hardware cost.

In order to alleviate these drawbacks of MIMO systems while preserving its advantages such as high spectral efficiency, a new modulation method for the MIMO systems, called Spatial Modulation (SM), has recently been proposed. Spatial modulation can reduce system complexity and hardware cost while maintaining data transmission rate. Spatial modulation can be a new modulation technique in the physical layer mainly because of the following features. First, low complexity and low cost. For point-to-point transmission, only one antenna is activated for data transmission at any time. This enables spatial modulation while avoiding inter-channel interference. It does not require a synchronization process for multiple antennas, but requires just one RF link, and a receiving end only needs to receive one information flow, so that a simple detection algorithm can be applied directly. Second, additional modulation orders. For example, $N_t$ antennas can bring an additional modulation order of $\log_2(N_t)$. Therefore, although just one antenna is activated at each time slice, spatial modulation can still provide a very high data transmission rate.

Spatial modulation can be used for point-to-multipoint multi-user transmission, and corresponding typical application scenarios include, for example, downlink multi-user transmission in a cellular communication system, where the base station is often equipped with a larger number of antennas to facilitate spatial modulation. Therefore, how to realize spatial modulation for point-to-multipoint multi-user transmission has become one of the research hotspots in this field.

SUMMARY OF THE INVENTION

A summary of the disclosure is set forth below to provide a basic understanding of some aspects of the disclosure. However, it should be understood that this summary is not an exhaustive overview of the disclosure. It is not intended to identify key or critical parts of the disclosure, and not to limit the scope of the disclosure. Its purpose is to present some of the concepts of the present disclosure in a simplified form, as a prelude to a more detailed description given later.

According to an aspect of the present disclosure, a communication device including a processing circuit is provided. The processing circuit is configured to: map a first portion of information bits for a first receiving end communication device to a first channel and a first portion of information bits for a second receiving end communication device to a second channel based on a predetermined mapping rule, in order to perform spatial modulation for the respective first portions of information bits for the first receiving end communication device and the second receiving end communication device; allocate a first transmission power to the first receiving end communication device, and allocate a second transmission power to the second receiving end communication device; and controls to transmit, by the first channel at the first transmission power, a second portion of information bits for the first receiving end communication device, while controls to transmit, by the second channel at the second transmission power, a second portion of information bits for the second receiving end communication device, wherein the first channel and the second channel are a same channel where the first portion of information bits for the first receiving end communication device are the same as the first portion of information bits for the second receiving end communication device.

According to another aspect of the present disclosure, a communication device including a processing circuit is provided. The processing circuit is configured to: perform serial interference cancellation (SIC) on received transmission signals, detect signals for other communication devices and cancel the detected signals as interference, until modulation symbols for the communication device per se are detected and a sequence number of a first channel for transmitting the received transmission signals is detected; and map the sequence number of the first channel to a first portion of information bits for the communication device per se based on a predetermined mapping rule, and determine the second portion of information bits for the communication device per se based on the modulation symbols of the communication device per se.

According to another aspect of the present disclosure, a method performed by a communication device is provided. The method includes mapping a first portion of information bits for a first receiving end communication device to a first channel and a first portion of information bits for a second receiving end communication device to a second channel based on a predetermined mapping rule, in order to perform spatial modulation for the respective first portions of information bits for the first receiving end communication device and the second receiving end communication device; allocating a first transmission power to the first receiving end communication device, and allocating a second transmission power to the second receiving end communication device; and controlling to transmit, by the first channel at the first transmission power, a second portion of information bits for the first receiving end communication device, while controlling to transmit, by the second channel at the second transmission power, a second portion of information bits for the second receiving end communication device, wherein the first channel and the second channel are a same channel where the first portion of information bits for the first receiving end communication device are the same as the first portion of information bits for the second receiving end communication device.

In accordance with another aspect of the present disclosure, a method performed by a communication device is provided. The method includes performing serial interference cancellation (SIC) on received transmission signals, detecting signals for other communication devices and cancel the detected signals as interference, until modulation symbols for the communication device per se are detected and a sequence number of a first channel for transmitting the received transmission signals is detected; and mapping the sequence number of the first channel to a first portion of information bits for the communication device per se based on a predetermined mapping rule, and determining the second portion of information bits for the communication device per se based on the modulation symbols of the communication device per se.

According to another aspect of the present disclosure, a communication device including a processing circuit is provided. The processing circuit is configured to: map a first portion of information bits for a first receiving end communication device to a first antenna in a first set of antennas based on a predetermined mapping rule, and a first portion of information bits for a second receiving end communication device to a second antenna in a second set of antennas, wherein there is at least one common antenna in the first set of antennas and the second set of antennas; allocate first transmission power to the first receiving end communication device, and allocate second transmission power to the second receiving end communication device; and transmit, by the first antenna at the first transmission power, a second portion of information bits for the first receiving end communication device, and transmit, by the second antenna at the second transmission power, a second portion of information bits for the second receiving end communication device.

According to another aspect of the present disclosure, a communication method is provided, the method comprising: mapping a first portion of information bits for a first receiving end communication device to a first antenna in a first set of antennas based on a predetermined mapping rule, and a first portion of information bits for a second receiving end communication device to a second antenna in a second set of antennas, wherein there is at least one common antenna in the first set of antennas and the second set of antennas; allocating first transmission power to the first receiving end communication device, and allocating second transmission power to the second receiving end communication device; and transmitting, by the first antenna at the first transmission power, a second portion of information bits for the first receiving end communication device, and transmitting, by the second antenna at the second transmission power, a second portion of information bits for the second receiving end communication device.

BRIEF DESCRIPTION OF THE DRAWINGS

A better understanding of the present disclosure can be achieved by referring to the detailed description given hereinafter in connection with the accompanying drawings, wherein same or similar reference signs are used to indicate same or similar components throughout the figures. The figures are included in the specification and form a part of the specification along with the following detailed descriptions, for further illustrating embodiments of the present disclosure and explaining the theory and advantages of the present disclosure. Wherein:

FIG. 8 is a diagram illustrating an example mapping rule of information bits and antenna numbers for applying SM technology for point-to-multipoint transmission, according to an embodiment herein;

DESCRIPTION OF EMBODIMENTS

Figure 1A:
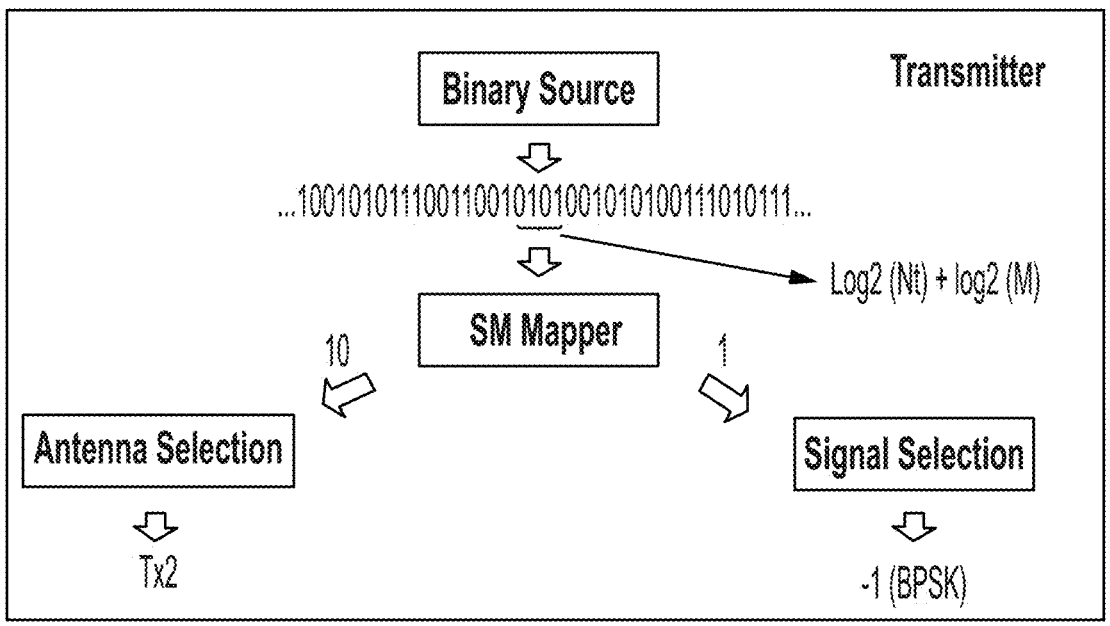
FIGS. 1A and 1B are schematic diagrams illustrating an implementation principle of spatial modulation (SM) technology and an example of its signal transmission.

Hereinafter, embodiments herein will be described in detail with reference to the accompanying drawings. Note that, in the present specification and the drawings, the structural elements that have substantially the same function and structure are denoted by the same reference numerals, and the repeated description of these structural elements is omitted.

Exemplary embodiments of the present disclosure will be described hereinafter with reference to the accompanying drawings. For the sake of clarity and conciseness, not all features of a actual implementation are described in the specification. However, it should be appreciated that implementation specific decisions must be made in the development of any such actual embodiment, so as to achieve specific goals of the developer. For example, to comply with constrain conditions related to system and business, and these constrain conditions may vary from implementation to implementation. Furthermore, it will also be appreciated that the development work may be more complicated and time consuming, although such development work is merely a routine task for those skilled in the art having benefit of this disclosure.

Only the device structure and/or operational steps closely related to the solutions according to the present disclosure are shown in the drawings in order to avoid obscuring the present disclosure with unnecessary detail, and other details that has little relation to the present disclosure are omitted.

First, the basic principles of SM technology and its implementation in some examples in point-to-point and point-to-multipoint transmission scenarios are briefly introduced with reference to FIGS. 1A-2B.

The basic idea of SM is to map the information bits to be transmitted into two types of information, namely amplitude phase modulation symbols (depending on the specific modulation method) and a sequence number of an antenna (or a channel). FIG. 1A is a schematic diagram illustrating an example of implementation principle of SM technology. According to the principle, a first portion of information bits to be transmitted are mapped to the sequence number of the antenna, and a second portion of information bits to be transmitted are mapped to the modulation symbols. As shown in the example of FIG. 1A, for information bits "101" to be transmitted from an information flow, for example, two bits "10" of the information bits are mapped to the sequence number of the antenna (here, for example, Tx2, i.e., the third antenna), for example, another bit "1" of the information bits is mapped to the modulation symbol "−1" (assuming that the modulation method here is Binary Phase Shift Keying (BPSK)). Therefore, the total modulation order B can be expressed as: $B=\log_2(N_t)+\log_2(M)$, where $N_t$ represents a total number of the antennas, and M represents a number of modulation symbols of a certain modulation scheme. For example, for BPSK, M is 2, and for quadrature phase shift keying (QPSK), M is 4. It can be seen that in SM of this example, only one antenna transmits signals at each time slice, while transmission power of the other antennas is zero. By mapping a portion of information bits to a selected antenna, although only one antenna is activated in one time slice, a higher data transmission rate can still be achieved.

Figure 1B:
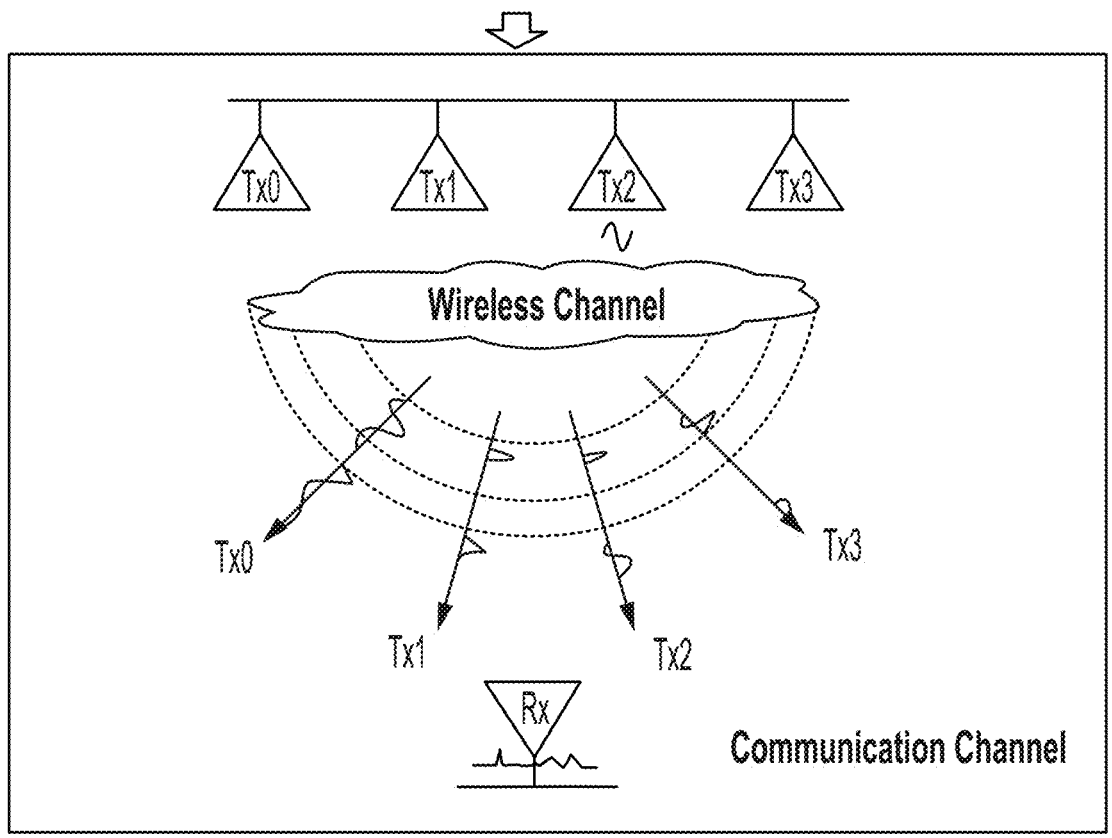

During the transmission of signals from the antennas to the receiving end via the wireless channel, signals emitted from different antennas may experience different propagation models due to different spatial positions of the respective antennas in an antenna array. FIG. 1B is a schematic diagram illustrating an example of signal transmission to which SM technology is applied. As shown in the example of FIG. 1B, assuming that a signal is transmitted through, for example, the antenna Tx2 at this time, the transmission powers on the antennas Tx0, Tx1, and Tx3 are all zero at this time, and a waveform of the signal received at the receiving end corresponds to that of wireless channel corresponding to the antenna Tx2, thus the receiving end can perform signal demodulation based on the received signals according to a corresponding signal detection algorithm (for example, MRC detection algorithm). That is, information bits mapped to the sequence numbers of antennas and information bits mapped to modulation symbols are respectively demodulated.

Figure 2A:
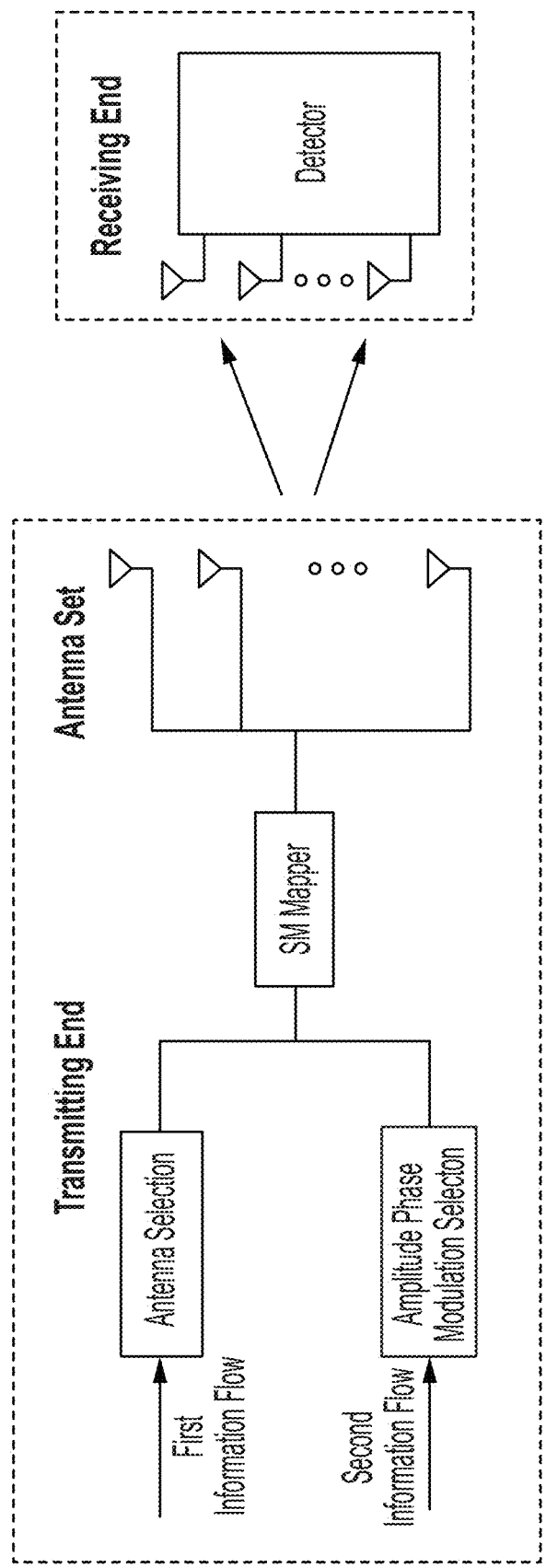
FIG. 2A is a schematic diagram illustrating an example system for applying SM technology for point-to-point transmission.

FIG. 2A is a schematic diagram illustrating an example system for applying SM technology for point-to-point transmission. In the example of FIG. 2A, antennas in a set of antennas (assuming $N_t$ antennas) at the transmitting end are all used for SM for a single receiving end. In the example system, the additional modulation order obtained by the receiving end for indicating the information bits to be transmitted by using the sequence number of the activated antenna can be expressed as $\log_2(N_t)$.

Figure 2B:
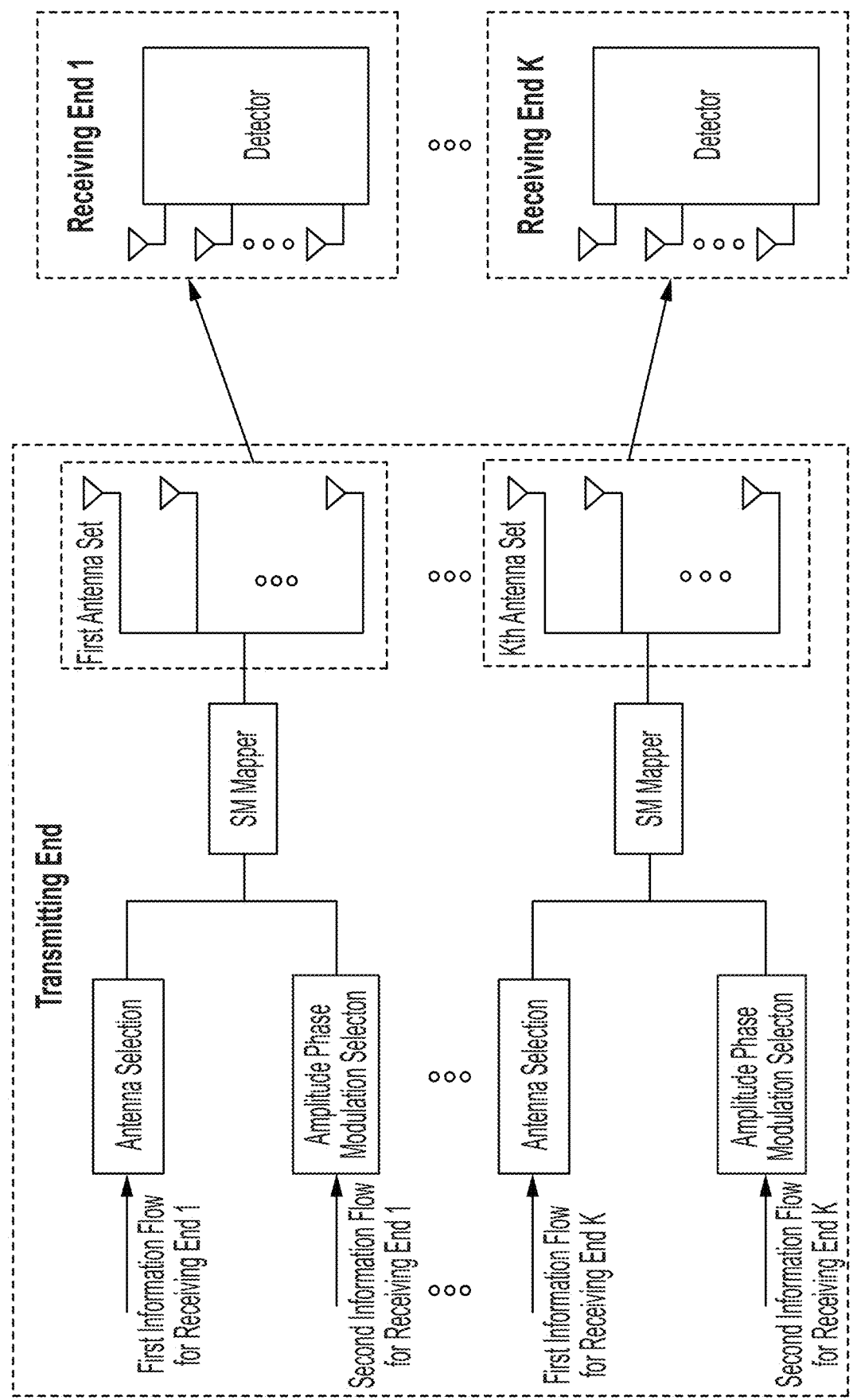
FIG. 2B is a schematic diagram illustrating an example system for applying SM technology for point-to-multipoint transmission.

When applying SM technology for point-to-multipoint transmission, such as in a downlink multi-user transmission scenario of a cellular communication system, an exemplary way is to group the set of antennas at the transmitting end (e.g., a base station). FIG. 2B is a schematic diagram illustrating an example system for applying SM technology for point-to-multipoint transmission. In the example of FIG. 2B, for K receiving ends, $N_t$ antennas, for example, are divided into K groups, and each group of $N_t/K$ antennas are dedicated to SM for a particular single receiving end. It is not difficult to find that in the example system of FIG. 2B, just the additional modulation order $\log_2(N_t)$ in the point-to-point transmission scenario of FIG. 2A is directly divided into K shares, and each receiving end obtains one share $$\left(\text{i.e. } \log_2\left(\frac{N_t}{K}\right)\right)$$

of the additional modulation order.

In the example system of FIG. 2B, in order to perform point-to-multipoint transmission, antenna resources at the transmitting end are simply allocated to multiple receiving ends, the additional modulation order obtained by each receiving end is limited, and improvement in data transmission rate is nto that significant. Since the number of antennas at the transmitting end is limited, the above drawback becomes increasingly obvious as the number of the receiving ends increases.

In the above example system of point-to-multipoint transmission, the SM for the multiple receiving ends can be regarded as orthogonal, that is, any antenna that is currently activated is dedicated to only one receiving end, which limits the additional modulation order each receiving end can obtained and the data transmission rate increasement. A communication device and method for non-orthogonal multi-user spatial modulation (SM) will be described below, wherein the transmitting end is capable of multiplexing antennas (channels) with same radio transmission resource (e.g., physical resource blocks in LTE) to perform SM for multiple receiving ends simultaneously. That is, thers is at least one antenna at the transmitting end that can be used for multiple receiving ends, such that the additional modulation order each receiving end can obtained and the data transmission rate can be greatly improved. Before introducing the non-orthogonal multi-user SM, the following aspects are clarified.

First, in SM, a portion of information bits are mapped to the sequence number of the antenna, and another portion of the information bits are mapped to modulation symbols and transmitted by the antenna represented by the sequence number. The mapping of information bits to antenna sequence numbers actually selects the antenna from which the modulation symbols are transmitted, that is, the channel on which the modulation symbols are transmitted. The terms "antenna" and "channel" are used interchangeably in the context herein due to the correspondence between the antenna and the channel. In the following description of the embodiments herein, although the term "antenna" is used more often, it will be apparent to those skilled in the art that the term "channel" can alternatively be used.

Secondly, in the embodiments herein, the term "antenna" can have its broadest meaning in the art. For example, an antenna can refer to a single physical antenna or a virtual antenna. The antenna can also have a similar meaning to an antenna port in the LTE standard, which can correspond to the transmission of a reference signal. That is, in the case where a same reference signal is transmitted from one or more physical antennas, the one or more physical antennas correspond to a single antenna port; similarly, in the case where two different reference signals are transmitted from one or more physical antennas, the one or more physical antennas correspond to two separate antenna ports. Those skilled in the art can clarify other meanings that the term antenna can have according to teachings of the present disclosure.

For example, in Chinese Patent Application No. 201610404821.0, entitled "Electronic Device and Method for Multi-Antenna Communication Apparatus", filed on Jun. 8, 2016, it proposed a method to reconstruct a physical channel to obtain a reconstructed channel, so that there is low correlation between the reconstructed channels, which is incorporated herein by reference in its entirety. Assuming that any two actual physical channels from the transmitting end to the receiving end are $h_1$ and $h_2$, respectively, and channel vectors of the two channels have strong correlation (i.e., the phase difference between the two is small), this will make performance of traditional SM technology degraded. According to the technology in the cited application, the two actual physical channels can be reconstructed using reconstruction parameters $[\alpha_1, \alpha_2]$, such that correlation between the reconstructed channels is reduced (i.e., the phase difference between the reconstructed channel vectors is increased), and preferably, the reconstructed channels are orthogonal to each other, that is, $\tilde{h}_1 \perp \tilde{h}_2$, wherein, $\tilde{h}_1 = \alpha_{1,1} h_1 + \alpha_{1,2} h_2$, $\tilde{h}_2 = \alpha_{2,1} h_1 + \alpha_{2,2} h_2$, then correlation between the reconstructed channels is minimized. According to the application, all transmit antennas are activated at each time slice, and each transmit antenna can be configured according to corresponding reconstruction parameters, in order to achieve channel reconstruction. Thus, in the embodiments herein, the term "antenna" can alternatively be a group of physical or virtual antennas corresponding to a reconstructed channel.

An example system for applying SM technology for point-to-multipoint transmission will be described below with reference to FIG. 3A.

Figure 3A:
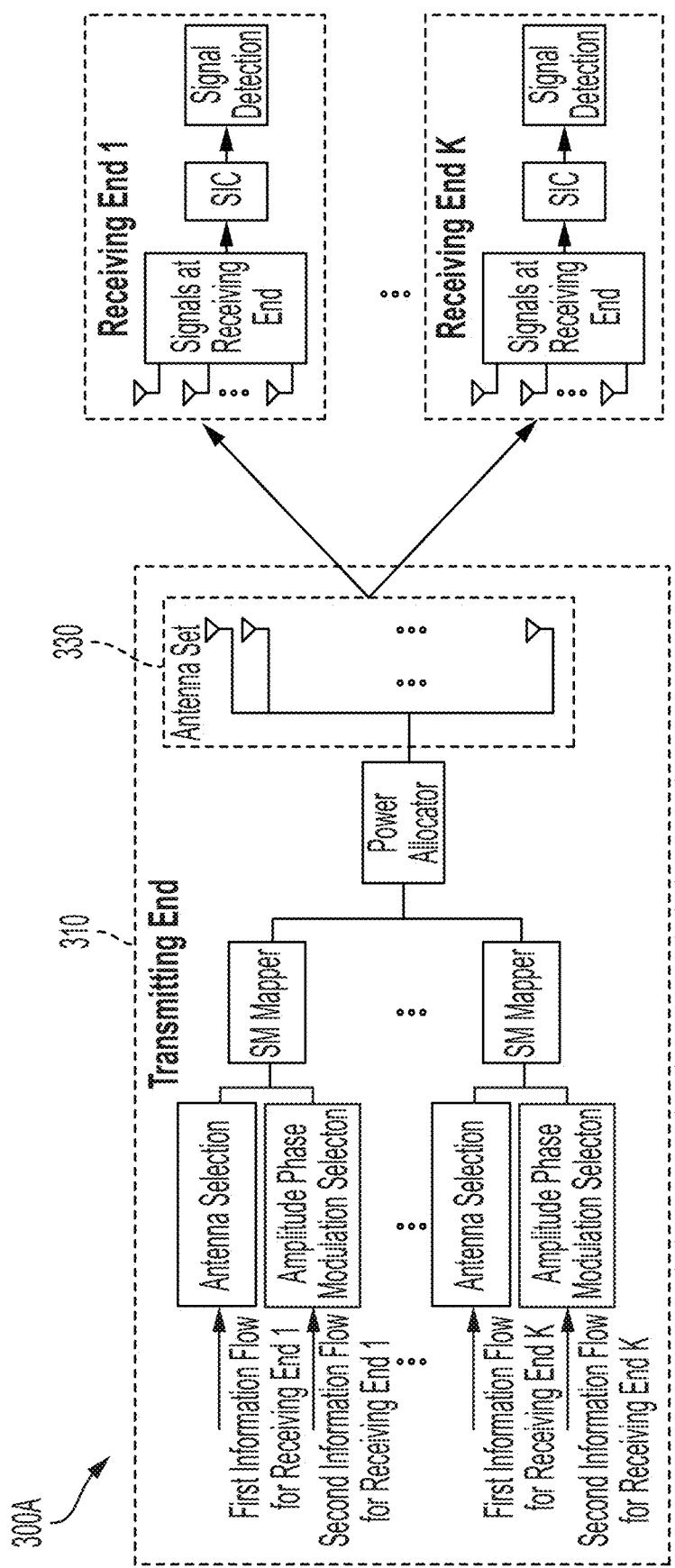
FIG. 3A is a schematic diagram illustrating an example system for applying SM technology for point-to-multipoint transmission, according to an embodiment.

In the multi-user SM system 300A according to an embodiment herein shown in FIG. 3A, there are $N_t$ (where $N_t \geq 2$) antennas in the antenna set 330 at the transmitting end (e.g., base station) 310, and these antennas form a RF channel to perform downlink data transmission for multiple receiving ends (for example, K receiving ends 1 to K). In one embodiment, the receiving end can be a user equipment in a cell of a cellular communication system. In the multi-user SM system 300A, at any time slice, any antenna in the antenna sets 330 at the transmitting end 310 can be multiplexed by multiple of the K receiving ends 1 to K for SM. In other words, for any of all the K receiving ends, any of the $N_t$ antennas can be selected to transmit signals, that is, all the $N_t$ antennas can be used as candidates. This is in contrast to the example system as shown in FIG. 2B, where a separate set of antennas correspond to each receive end. For example, for the receiving end 1 in FIGS. 2B and 3A, only antennas in the first set of antennas at the transmitting end can be used to transmit signals to the receiving end in FIG. 2B, and any antenna at the transmitting end can be used to send signals to the receiving end in FIG. 3A. As indicated, the transmitting and receiving ends in this example can correspond to the base station and user equipment in the cellular communication system, respectively. To be noted, however, in this example and the alternative examples described below, the transmitting end can also correspond to any electronic device (e.g., a personal electronic device) that needs to send information to multiple devices at the other end, and the receiving end can correspond to the devices at the other end (e.g., also a personal electronic device).

Figure 4A:
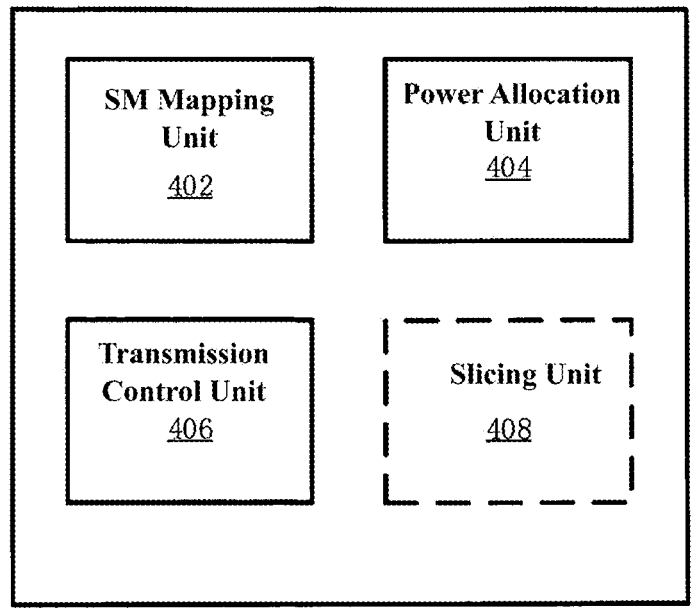
FIG. 4A is a functional configuration block diagram illustrating an example of a transmitting end communication device for applying SM technology for point-to-multipoint transmission, according to an embodiment herein.

FIG. 4A is a functional configuration block diagram illustrating an example of a transmitting end communication device for applying SM technology for point-to-multipoint transmission, according to an embodiment herein. The transmitting end communication device 400 can be an example of the communication device at the transmitting end 310 in FIG. 3A. As shown in FIG. 4, in one embodiment, the transmitting end communication device 400 can include a SM mapping unit 402, a power allocation unit 404, and a transmission control unit 406.

The SM mapping unit 402 can be configured, for example, to map a first portion of information bits for a first receiving end communication device (e.g., receiving end 1) to a first channel (e.g., a channel corresponding to a first antenna in the antenna set 330) and to map a first portion of information bits for a second receiving end communication device (e.g., receiving end 2) to a second channel (e.g., a channel corresponding to a second antenna in the antenna set 330) based on a predetermined mapping rule, in order to perform spatial modulation for the first portions of information bits for the first receiving end communication device (e.g., receiving end 1) and the second receiving end communication device (e.g., receiving end 2).

The power allocation unit 404 can be configured, for example, to allocate a first transmission power to the first receiving end communication device (e.g., receiving end 1) and a second transmission power to the second receiving end communication device (e.g., receiving end 2).

The transmission control unit 406 can be configured, for example, to control to transmit, by the first channel (e.g., the channel corresponding to the first antenna in the antenna set 330) at the first transmission power, a second portion of information bits for the first receiving end communication device (e.g., receiving end 1), while control to transmit, by the second channel (e.g., the channel corresponding to the second antenna in the antenna set 330) at the second transmission power, a second portion of information bits for the second receiving end communication device (e.g., receiving end 2).

In the case where the first portion of information bits for the first receiving end communication device (e.g., receiving end 1) and the first portion of information bits for the second receiving end communication device (e.g., receiving end 2) are the same, the first channel and the second channel can be a same channel (e.g., a channel corresponding to the same antenna in the antenna set 330). In other words, the same channel or the same antenna can be multiplexed simultaneously by different receiving end communication devices.

One or more of the SM mapping unit 402, the power allocation unit 404, and the transmission control unit 406 can be implemented by a processing circuit. Here, a processing circuit can refer to various implementations of digital circuitry, analog circuitry, or mixed signal (combination of analog and digital) circuitry that perform functions in a computing system. Processing elements can include, for example, circuits such as integrated circuits (ICs), application specific integrated circuits (ASICs), portions or circuits of individual processor cores, entire processor cores, separate processors, programmable hardware devices such as field programmable gate arrays (FPGAs), and/or a system including multiple processors.

It will be appreciated that the transmitting end communication device 400 can be implemented at the chip level or can be implemented at the device level by including other external components. For example, the transmitting end communication device 400 can operate as a multi-antenna communication device as a whole machine, and the transmitting end communication device 400 can also include a plurality of antennas.

It should further be understood that the various units described above are merely logical functional blocks that are divided according to the specific functions implemented, and it is not intended to limit them to the particular implementation. In actual implementation, each of the above functional units can be implemented as a separate physical entity, or can be implemented by a single entity (eg, a processor (CPU or DSP, etc.), an integrated circuit, etc.).

Exemplary operations performed by the communication device 400 at the transmitting end 310 are described in detail below in conjunction with the flowchart of FIG. 4B.

At any time slice, at the communication device 400 at the transmitting end 310, for any of the K receiving ends (e.g., at least one of the first receiving end communication device and the second receiving end communication device), the information bits (i.e., the first portion of information bits) in a first information flow for the receiving end are mapped to a respective antenna based on the predetermined mapping rule, in order to perform SM on the information bits (step 401). For example, based on the predetermined mapping rule, the first portion of information bits for the receiving end 1 can be mapped to the first antenna in the antenna set 330, and the first portion of information bits for the receiving end 2 can be mapped to the second antenna in the antenna set 330, and so on, the first portion of information bits for the receiving end k can be mapped to a kth antenna in the antenna set 330. Here, for the first, second and kth antennas, there can be at least two antennas that are a same antenna with a same antenna sequence number (e.g., the first portions of the information bits for the receiving ends 1 and 2 are the same), or can be at least two antennas that are different antenna with different antenna sequence numbers (e.g., the first portions of information bits for the receiving ends 1 and 2 are different). Step 401 can be performed, for example, by the SM mapping unit 402 of the communication device 400 at transmitting end 310.

The above predetermined mapping rule is a rule that specifies a correspondence between information bits and an antenna (channel) to be selected for transmission of information, e.g., as shown in the example of FIG. 8. FIG. 8 is a diagram illustrating an example mapping rule 800 of information bits and antenna sequence numbers for applying SM technology for point-to-multipoint transmission, according to an embodiment herein. In the example in FIG. 8, according to the mapping rule 800, when the first information bits for the receiving end are, for example, 00, 01, 10, and 11, respectively, the first information bits are respectively mapped to the antennas with a sequence number 1, 2, 3, 4, respectively. It should be understood that the number of information bits that can be mapped to the antenna number is related to the number of antennas $N_t$ at the transmitting end. For example, if there are 4 antennas, the number of information bits that can be mapped to each antenna is 2 bits; if there are 8 antennas, the number of information bits that can be mapped to each antenna is 3 bits. That is, the number of information bits that can be mapped can be expressed as $\log_2 N_t$. Therefore, the embodiments herein are especially suitable for millimeter wave (mmWave) communication scenarios where a large number of antennas can be deployed. However, the application of the present disclosure is not limited thereto, and there is no limitation on the applied frequency band.

It should be noted that the mapping rule 800 of information bits and antenna numbers in FIG. 8 is merely exemplary. Different mapping rules can be predetermined for a specific number of antennas, for specifying the mapping between the information bits and the antenna numbers, as long as the transmitting end and each receiving end agree on the mapping rule. The mapping relationship can be stored in storage devices at the transmitting end and the receiving end, and can be statically configured or dynamically updated according to information such as channel status. For example, in one embodiment, the transmitting end communication device 400 can further include a memory that can be configured to store predetermined mapping rules for reading by a processing circuit, the mapping rule can specify the mapping between the information bits and the antenna sequence numbers.

According to an embodiment, the predetermined mapping rules applied by different receiving ends can be the same, such that if the first portion of information bits for the receiving end 1 and the first portion of information bits for the receiving end 2 are the same (for example, both are information bits 00 shown in FIG. 8), the mapped first antenna and second antenna can be the same antenna (for example, the antenna with sequence number 1 in FIG. 8).

According to another embodiment, different receiving ends can apply different predetermined mapping rules, such that if the first portion of information bits for the receiving end 1 and the first portion of information bits for the receiving end 2 are the same, the mapped first antenna and second antenna can be different antennas; if the first portion of information bits for the receiving end 1 and the first portion of information bits for the receiving end 2 are different, the mappled first antenna and second antenna can still be the same antenna, as long as the transmitting end and each receiving end reach an agreement on the predetermined mapping rule. In this latter embodiment, only receiving ends that reach the agreement with the transmitting end on the specific mapping rule can determine the correct antenna sequence number, which can be beneficial to improve security of information transmission.

In one embodiment, information bits in the second information flow (i.e., a second portion of information bits) for the receiving end are further mapped to particular modulation symbols, in order to perform modulation for the information bits (e.g., the amplitude phase modulation, frequency modulation, or other types of modulation). According to an embodiment, a particular modulation symbols can be, for example, a particular amplitude phase modulation symbol (i.e., a constellation point in the constellation) in the amplitude phase modulation scheme, in order to perform amplitude phase modulation for the information bits (step 407). In one embodiment, the particular amplitude phase modulation scheme can depend on channel state information at the receiving end (eg, a receiving signal to noise ratio SNR condition at the receiving end), for example, a higher receiving SNR can correspond to a higher order modulation scheme; vice versa. Here, the amplitude phase modulation includes any modulation scheme that modulates at least one of the amplitude and phase of a carrier to transmit data, such as, but not limited to, BPSK, QPSK, 2ASK, 4ASK, or 16QAM, and the like. Step 407 can be performed, for example, by the SM mapping unit 402 of the communication device 400 at the transmitting end 310. It is noted that although step 407 is shown in FIG. 4 as being performed in parallel with step 401, in other embodiments, step 407 can also be performed before or after step 401.

It should be noted that, at the transmitting end, the first and second information flows of the multiple receiving ends can have multiple sources. In one embodiment, the first and second information flows at the receiving end of FIG. 3A can be from the same source of information but split into two information flows in a particular manner. In another embodiment, source information (such as a small number of, but important information, such as a security key) can not be split, but all entered into the first information flow. Then, the second information flow can be information bits that are not to be transmitted, but all 1, all 0 or any auxiliary information bits. That is, in this embodiment, only the first information flow is transmitted by using system 300A. In still other embodiments, if the transmitting end desires to transmit voice or application data to the receiving end, it may be desirable to encrypt the voice or application data with a security key to enhance security. Then, the encrypted voice or application data to be transmitted is used as the second information flow, and the security key for encrypting the voice or application data is used as the first information flow, the information bits corresponding to the security key are mapped to the antenna sequence number by the SM technology herein. In the latter two cases, communication security can be guaranteed to a certain extent.

Therefore, in one embodiment, the transmitting end communication device 400 can further include a slicing unit 408 that splits the data to be transmitted for the first and second receiving end communication devices into first portion of information bits and second portion of information bits for transmission, wherein the length of the first portion of information bits is related to the value of $N_t$. Alternatively, the transmitting end communication device 400 can not include the slicing unit 408. Then, the information flow to be transmitted can correspond to the first information flow of each receiving end in FIG. 300A, and the second information flow can be not the modulated data, but all 1, all 0 or any bit signals. This can be applied to use the first information flow to carry little volume but important information in, for example, military applications to improve security. It should be clear to those skilled in the art that the receiving end needs to perform processing corresponding to the transmitting end after restoring the information bits in the first information flow and the second information flow. For example, if the first information flow and the second information flow are obtained by slicing the source information, it is necessary to perform corresponding combination processing on the information bits in the restored first and second information flows at the receiving end.

At the communication device 400 at the transmitting end 310, the transmission power is allocated to the receiving ends, thereby forming a transmission power allocation result (step 403). For example, the first receiving end communication device (e.g., the receiving end 1) can be allocated with a first transmission power and the second receiving end communication device (e.g., the receiving end 2) can be allocated with a second transmission power. Step 403 can be performed, for example, by the power allocation unit 404 of the communication device 400 at the transmitting end 310.

According to an embodiment, the transmission power allocation result can be calculated according to a transmission power allocation principle, which can include one or more of the following: allocating a lower transmission power to a receiving end communication device closer to the transmitting end; allocating a lower transmission power to a receiving end communication device with higher receiving SNR; allocating a higher transmission power to a receiving end communication device with a higher data rate demand; and causing the receiving SNRs of all receiving end communication devices to be at the same level. For example, according to a principle, assuming that the radio channel condition of the receiving end 2 is better than that of the receiving end 1, in order to enable the two receiving ends to detect signals for themselves, a larger transmission power is allocated to the receiving end 1, for example $p_1=0.8$, and a smaller power, for example, p2=0.2 is allocated to the receiving end K (assuming the total power is 1), such that signals are transmitted based on this transmission power allocation. Although several specific examples of the power transmission allocation principle are given above, the power transmission allocation principle is not limited to these specific examples, and those skilled in the art can design other power transmission allocation principles according to actual application and design requirements.

In one embodiment, the transmission power allocation result can include information indicating an absolute value or a relative value indicating transmission power allocated to each of all the receiving ends. In another embodiment, the transmission power allocation result can include information indicating an order of transmission power allocated to a target receiving end or demodulation order. This order or demodulation order information can be informed to the corresponding receiving end. In one embodiment, the transmission power allocation result can be included in the physical layer downlink control information, for example, in the scheduling information, and in particular can be carried by, for example, a PDCCH channel in LTE.

In one embodiment, the transmission power is allocated in accordance with a transmission power allocation result that is pre-computed and stored for a particular transmission power allocation principle; in another embodiment, the transmission power allocation result is calculated in real time for transmission power allocation. Therefore, the transmitting end can read the power allocation parameter from the system preset information table, or can choose to adjust the power allocation in real-time through the user feedback information, which depends on the processing capability of the transmitting end. It can be seen that off-line computing can reduce the computational load at the transmitting end compared to real-time computing solutions.

Next, the communication device 400 at the transmitting end 310 controls, based on the mapping performed in step 401, to transmit the second portion of information bits for each receiving end by the mapped antenna at the corresponding transmission power (step 405). For example, control is performed to transmit the second portion of information bits for the receiving end 1 by the first antenna in the antenna set 330 at the first transmission power, and control is performed to transmit the second portion of information bits for the receiving end 2 by the second antenna in the antenna set 330 at the second transmission power, and so on, control is performed to transmit the second portion of information bits for the receiving end k by the kth antenna in the antenna set 330 at the kth transmission power. Step 407 can be performed, for example, by the transmission control unit 406 of the communication device 400 at the transmitting end 310.

If the first portions of information bits for the multiple receiving ends (for example, the receiving end 1 and the receiving end 2) are the same (for example, both are the information bits 00 in FIG. 8), portions of information bits in the second information flows for the multiple receiving ends can be simultaneously superimposed and transmitted by the same mapped antenna (for example, by the same antenna with the sequence number 1 in FIG. 8). As indicated earlier, there is a correspondence between the antennas and the channels. Therefore, those skilled in the art will understand that mapping information bits to an antenna here is to map information bits to a channel corresponding to the antenna, and transmitting information bits by the antenna is to transmit information bits by a channel corresponding to the antenna.

Examples of the exemplary system described in FIG. 3A are described below in conjunction with FIGS. 3B and 3C.

Figure 3B:
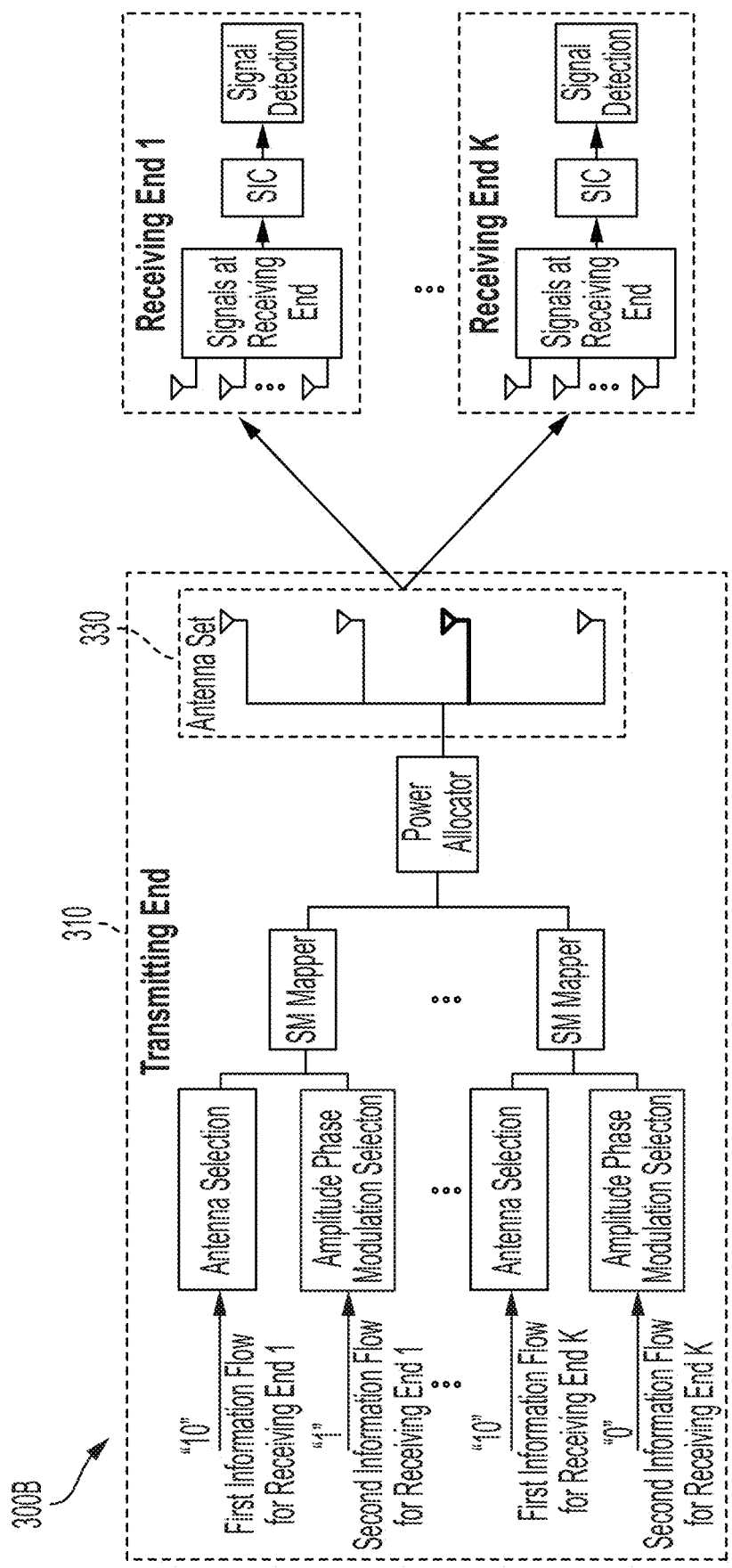
FIG. 3B is a schematic diagram illustrating an example of the system for applying SM technology for point-to-multipoint transmission, according to an embodiment herein.

FIG. 3B is a schematic diagram illustrating one example of the exemplary system for applying SM technology for point-to-multipoint transmission, according to one embodiment herein. In this example, the transmitting end can, for example, have 4 antennas (i.e. $N_t=4$). As shown in the example of FIG. 3B, at the transmitting end 310, each 2 bits in the first information flow for the receiving end are mapped to the antenna numbers based on predetermined mapping rules. In this example, the predetermined mapping rule can be the mapping rule 800 as shown in FIG. 8. At the transmitting end 310, the transmission power is also allocated to the receiving ends to form a transmission power allocation result. Next, the information bits in the second information flow for all the multiple receiving ends are respectively mapped to antennas according to the mapping rule 800 for transmission in a superimposing manner.

In this example, according to the receiving SNR at the receiving end, the amplitude phase modulation is performed on each bit in the second information flow for the receiving end by using the BPSK modulation scheme (i.e., the constellation point symbols are +1 and −1), and the bits are transmitted by the antenna represented by the above mapped sequence number. For example, a message "101" is to be transmitted to the receiving end 1. According to the mapping rule 800, for the receiving end 1, 2 bits "10" in the first information flow are mapped to the third antenna, and 1 bit "1" in the second information flow is mapped to the BPSK modulation symbol "−1", then the transmission signal vector for the receiving end 1 is $[0\ 0\ −1\ 0]^T$. In this vector, "−1" represents the modulation symbol whose position in the vector corresponds to the mappled antenna. In this example, the third antenna is used for signal transmission, and the power for each of the other three antennas is zero. Further, for example, a message "100" is to be transmitted to the receiving terminal K. For the receiving end K, the 2 bits "10" in the first information flow are also mapped to the third antenna, and the 1 bit "0" in the second information flow is mapped to the BPSK modulation symbol "1", then the transmission signal vector for the receiving end K is [0 0 1 0]T. The meaning of the vector can be understood similarly to the above. It is not difficult to see that, since the bits (the first information bits) of the first information flow for the receiving end 1 and the bits (first information bits) of the first information flow for the receiving end K are the same (here, both are 10), therefore, the modulation signals for the receiving end 1 and the receiving end K will be transmitted by the same antenna (i.e., the third antenna) to which the first information bit is mapped.

Figure 3C:
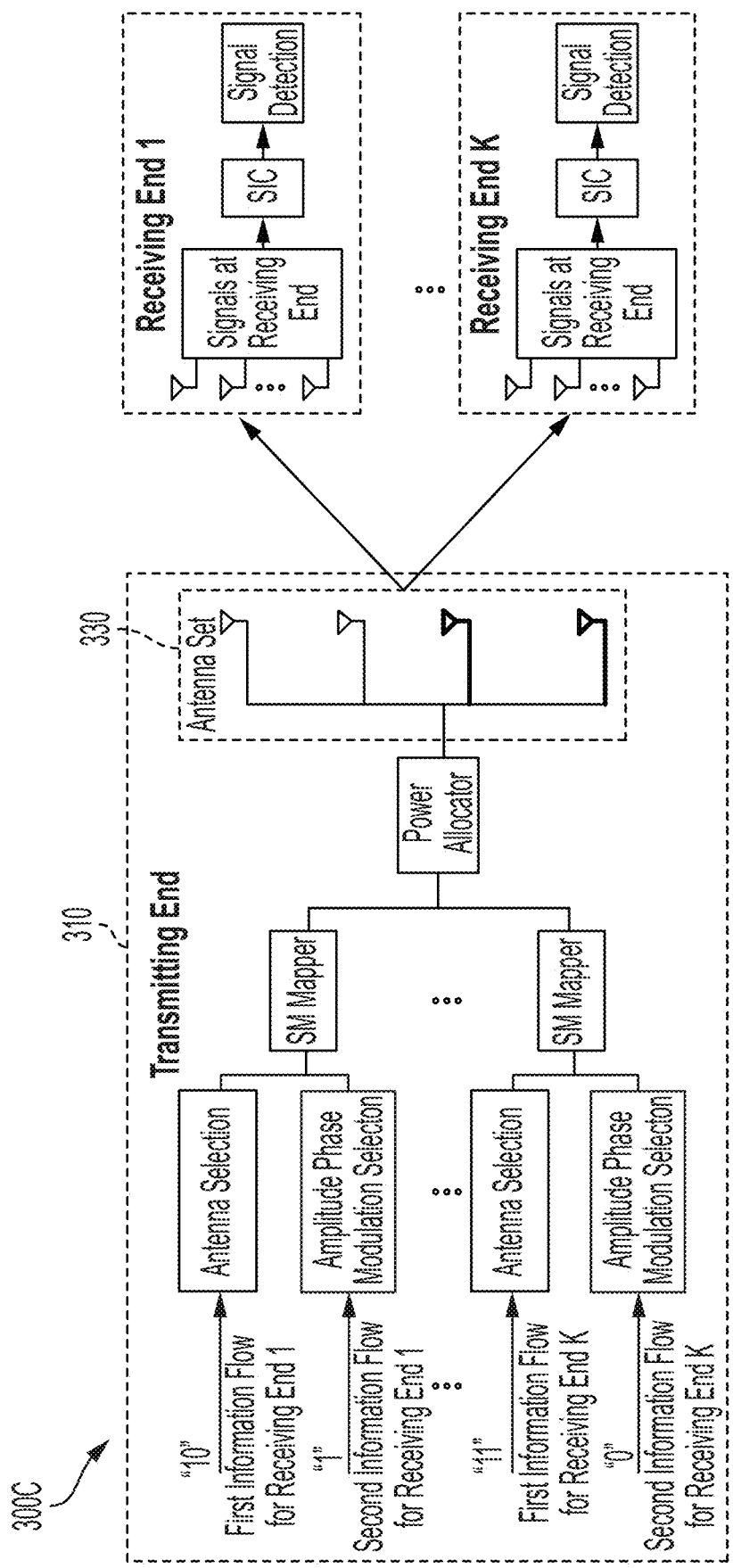
FIG. 3C is another schematic diagram illustrating the example of the system for applying SM technology for point-to-multipoint transmission, according to an embodiment herein.

It should also be noted that if the information bits in the first information flows for the receiving end 1 and the receiving end K are different, the antennas mapped or selected according to the mapping rule 800 as shown in FIG. 8 can be different, which is similar to the case in the example of FIG. 3C. FIG. 3C is another schematic diagram illustrating the system of FIG. 3B for applying SM technology for point-to-multipoint transmission, according to one embodiment herein. For example, if a message "101" is to be transmitted to the receiving end 1, and the message "110" is to be transmitted to the receiving end K, according to the mapping rule 800 shown in FIG. 8, the 2 bits "10" in the first information flow for the receiving end 1 are mapped to the third antenna, and the 2 bits "11" in the first information flow for the receiving end K are mapped to the fourth antenna. Accordingly, since the bits (the first information bits) of the first information flow for the receiving end 1 and the bits (the first information bits) of the first information flow for the receiving end K are different, the respective one bit in the second information flows for the two receiving ends will be transmitted by different antennas respectively.

Figure 5A:
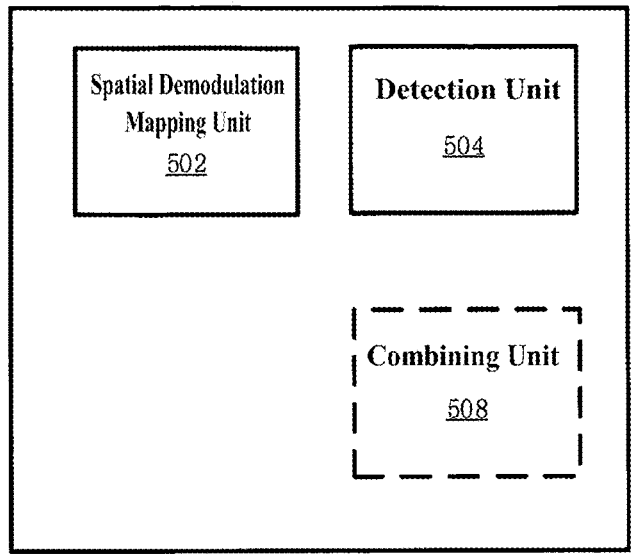
FIG. 5A is a functional configuration block diagram illustrating an example of a receiving-side communication device for applying SM technology for point-to-multipoint transmission, according to an embodiment herein.

FIG. 5A is a functional configuration block diagram illustrating an example of a receiving end communication device for applying SM technology for point-to-multipoint transmission, according to an embodiment herein. The receiving end communication device 500 can be an example of the communication device at any receiving end k of FIG. 3A. As shown in FIG. 5A, in one embodiment, the receiving end communication device 500 can include a detection unit 504 and a spatial demodulation mapping unit 502.

The detection unit 504 of the receiving end k can, for example, be configured to perform serial interference cancellation (SIC) on received transmission signal, detect signals for other receiving end communication devices (e.g., the receiving end 1, receiving end K, etc.) and cancel the detected signal as interference, until a modulation symbol for the communication device per se (i.e., the receiving end k) is detected and a sequence number of the first channel (e.g., the channel corresponding to the first antenna in the antenna set 330) that transmitted the received transmission signal is detected.

The spatial demodulation mapping unit 502 of the receiving end k can, for example, be configured to map the sequence number of the first channel (e.g., the channel corresponding to the first antenna in the antenna set 330) to the first portion of information bits for the communication device per se (i.e., the receiving end k) based on the predetermined mapping rule (e.g., the mapping rule 800 as shown in FIG. 8), and determine the second portion of information bits for the communication device per se (i.e., the receiving end k) based on the modulation symbols for the communication device per se.

One or more of the detection unit 504 and the spatial demodulation mapping unit 502 can be implemented by a processing circuit. Here, a processing circuit can refer to various implementations of digital circuitry, analog circuitry, or mixed signal (combination of analog and digital) circuitry that perform functions in a computing system. Processing elements can include, for example, circuits such as integrated circuits (ICs), application specific integrated circuits (ASICs), portions or circuits of individual processor cores, entire processor cores, separate processors, programmable hardware devices such as field programmable gate arrays (FPGAs), and/or a system including multiple processors.

It will be appreciated that, similarly, the receiving end communication device 500 can be implemented at the chip level, or can also be implemented at the device level by including other external components. For example, the receiving end communication device 500 can operate as a whole device as a communication device, and can also include one or more antennas.

It should further be understood that the various units described above are merely logical functional blocks that are divided according to the specific functions implemented, and it is not intended to limit them to the particular implementation. In actual implementation, each of the above functional units can be implemented as a separate physical entity, or can be implemented by a single entity (eg, a processor (CPU or DSP, etc.), an integrated circuit, etc.).

Exemplary operations performed by, for example, the communication device 500 at the receiving end k are described in detail below in conjunction with the flowchart of FIG. 5B.

At the communication device 500 at the receiving end k, SIC is performed on the transmission signal received from the transmitting terminal 310 to detect signals for other receiving ends and cancel the signals for other receiving ends as interference, until a signal for the receiving end per se is detected (step 501). In one embodiment, the signal for the receiving end k per se can include a modulation symbol for the receiving end and a sequence number of the first channel that transmitted the received transmission signal. It can be understood that the sequence number of the first channel can correspond to the sequence number of a specific antenna (for example, the first antenna). Step 501 can be performed, for example, by the detection unit 504 of the communication device 500 at the receiving end k.

In one embodiment, at the communication device 500 at the receiving end k, information is received indicating the order of the transmission power used by the first antenna in transmitting the signal for the receiving end per se among the transmission powers used in transmitting signal for all receiving end communication devices (for example, including the receiving end 1, the receiving end K, etc.), wherein the number of times the SIC is performed depends on the order. In one embodiment, in the SIC, signals for other communication devices are detected by a detection algorithm, including the ML algorithm or the MRC algorithm. The process of the SIC can be referred to the description, for example, with respect to FIGS. 9-10.

In one embodiment, the sequence number of the first channel can be detected based on the channel state information, which can be determined by the receiving end k based on training sequences transmitted by the first antenna.

At the communication device 500 at the receiving end k, spatial demodulation is performed on the signal for the receiving end k per se (step 503). In one embodiment, the operation in step 503 includes, in sub-step 503*a*, mapping the sequence number (e.g., "1") of the first channel by which the received transmission signal is transmitted to the first portion of information bits (e.g., "00") for the receiving end k per se based on a predetermined mapping rule (e.g., the mapping rule 800 as shown in FIG. 8). In another embodiment, the operation in step 503 further includes, in sub-step 503*b*, mapping the modulation symbols for the receiving end k to the second portion of information bit s for the receiving end k, according to the corresponding amplitude phase modulation scheme. Step 503 can be performed, for example, by the spatial demodulation mapping unit 502 of the communication device 500 at the receiving end k.

In one embodiment, according to the mapping rule 800 shown in FIG. 8, when the sequence numbers of the first channels on which the received transmission signals are transmitted are, for example, 1, 2, 3, 4, respectively, the channel sequence numbers are accordingly mapped to the first portions of information bits with bit values of 00, 01, 10, and 11, respectively. Accordingly, in one embodiment, the receiving end communication device 500 can further include a memory configured to store predetermined mapping rules for reading by a processing circuit, and the mapping rule can specify a mapping between information bits and antenna sequence numbers.

In one embodiment, at the communication device 500 at the receiving end k, information about the amplitude phase modulation scheme is received, and the second portion of information bits for the receiving end k per se is determined by using the amplitude phase modulation scheme indicated by such information.

In an embodiment, after the first portion of information bits and the second portion of information bits are restored, the receiving end k needs to perform processing corresponding to the transmitting end on them. For example, in the case where the first portion of information bits and the second portion of information bits are obtained by splitting the source information at the transmitting end, it is necessary to combine the first portion of information bits for the receiving end per se with the second portion of information bits for the receiving end to obtain the original transmission data flow. For example, in one implementation, the receiving end communication device 500 can further include a combining unit 508 that combines the first portion of information bits for the communication device per se and the second portion of information bits for the communication device per se into the original transmission data flow.

It should be understood that the functional configurations of the communication devices shown in FIG. 4A and FIG.

5A are merely examples, and those skilled in the art can modify the above functional configurations according to the principles of the present disclosure, for example, combining the above functional units, adding, deleting, and/or changing some functional units. In addition, in order to avoid obscuring the present invention, descriptions of some well-known functional units and their operations are omitted in the description of the embodiment of FIGS. 4A and 5A, but these are easily implemented by those skilled in the art in accordance with the principles of the present disclosure and well-known knowledge in the art.

Figure 4B:
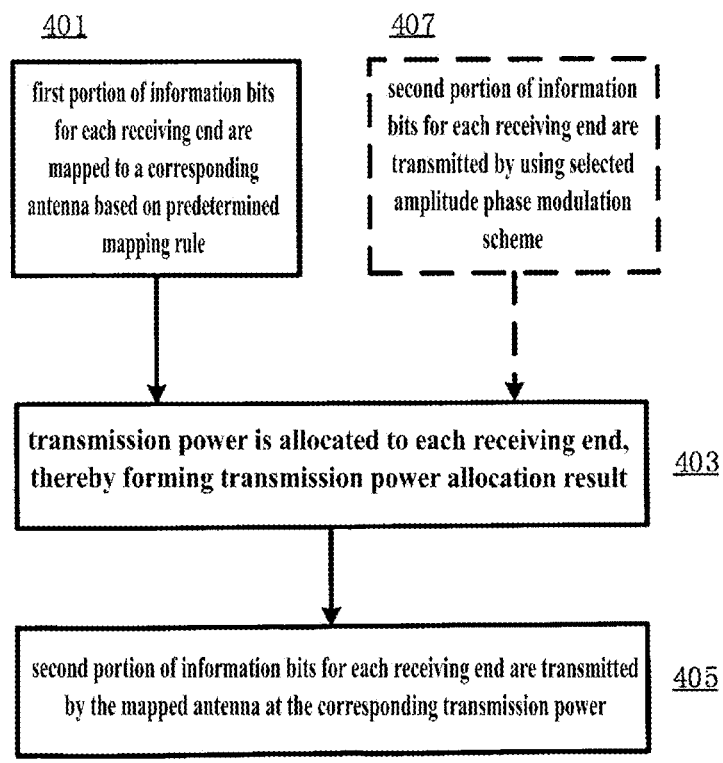
FIG. 4B is a flowchart illustrating an example of a transmitting end method for applying SM technology for point-to-multipoint transmission, according to an embodiment herein.
Figure 5B:
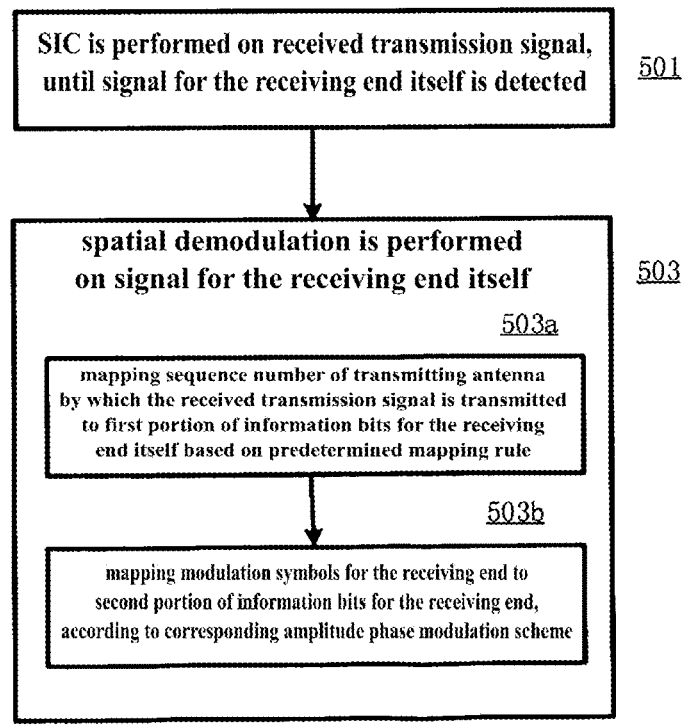
FIG. 5B is a flowchart illustrating an example of a receiving end method for applying SM technology for point-to-multipoint transmission, according to an embodiment herein.

In addition, it should be noted that the flowcharts shown in FIG. 4B and FIG. 5B are only examples and are non-limiting, and those skilled in the art can also make various modifications according to the principles of the present disclosure, such as adjusting the execution of the above method flow, deleting/adding some steps, etc.

In the above non-orthogonal multi-user SM, the transmitting end multiplexes the antennas to perform SM for the multiple receiving ends simultaneously, thereby increasing the additional modulation order each receiving end can obtain and data transmission rate. As noted above, in the above non-orthogonal multi-user SM, such antennas multiplexing is also a kind of multiplexing of channels. It should be noted that, according to these teachings, those skilled in the art can conceive various ways to multiplex the antennas or channels of the transmitting end. Accordingly, those skilled in the art can predetermine different mapping rules to match with ways of multiplexing.

Figure 6:
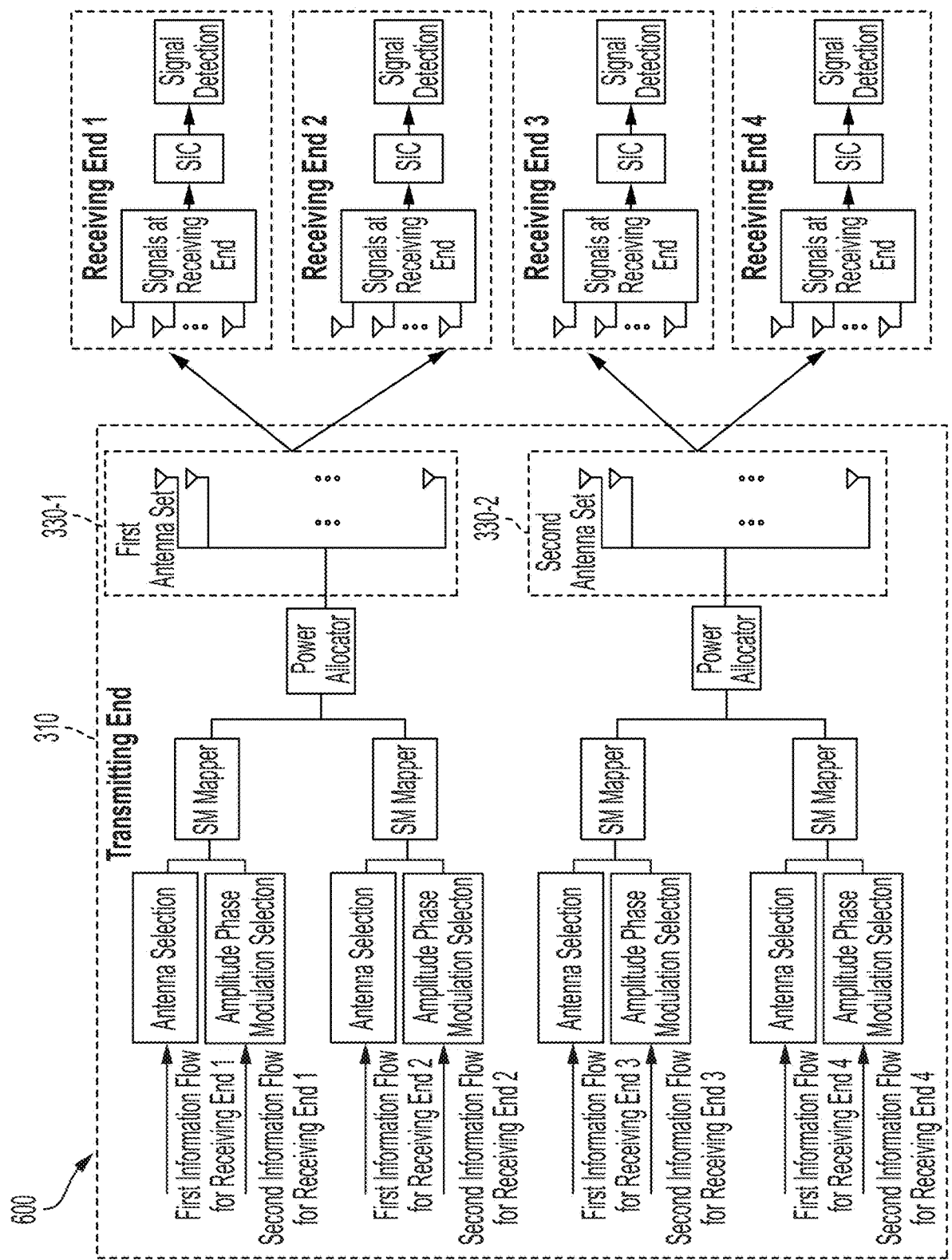
FIG. 6 is a schematic diagram illustrating another example system for applying SM technology for point-to-multipoint transmission, according to an embodiment herein.

For example, in one embodiment, the antennas at the transmitting end can be grouped such that each group of antennas can be multiplexed and dedicated to SM for multiple receiving ends. FIG. 6 is a schematic diagram illustrating the example system for applying SM technology for point-to-multipoint transmission, which is a variation of the example system shown in FIG. 3A. In the example system in FIG. 6, the antennas of the transmitting end 310 are grouped into two or more antenna sets (e.g., sets 330-1 and 330-2), and any antenna in each antenna set can be multiplexed for any receiving end in a corresponding subset of receiving ends. For example, the antenna set 330-1 can be multiplexed and dedicated to the SM for the receive ends 1 and 2, and the antenna set 330-2 can be multiplexed and dedicated to the SM for the receive ends 3 and 4, and the way of multiplexing the corresponding set of antennas for each subset of receiving ends is similar to those described with reference to FIG. 3A. It should be noted that, in this embodiment, the improvements on the additional modulation order obtained by each receiving end and the data transmission rate are less significant than the case where the antennas of the transmitting end are not grouped, but still better than the case where each one antenna is dedicated to one receiving end (i.e., the antennas are not multiplexed). In this case, it is necessary to determine in advance the mapping rules that matches with the first antenna set 330-1 and the second antenna set 330-2. The mapping rules need to match with the number of antennas in the antenna set. For example, if there are 4 antennas in the first antenna set, the mapping rule 800 in FIG. 8 can be used; if there are 8 antennas in the second antenna set, different mapping rules can be determined in advance to specify the correspondence between three information bits in the first information flow and the 8 antennas. It is still necessary for the mapping rules to specify different correspondences for multiple receiving ends served by different antenna sets, to ensure that the same bit values for the multiple receiving ends served by the different antenna sets can be mapped to antennas in the respective antenna sets. For example, for the receiving end 1 served by the first antenna set and the receiving end 4 served by the second antenna set in FIG. 6, when the first portion of information bits for the two receiving ends are both "01", these portions of information bits need to be mapped to the antennas in the first and second antenna sets, respectively.

Figure 7:
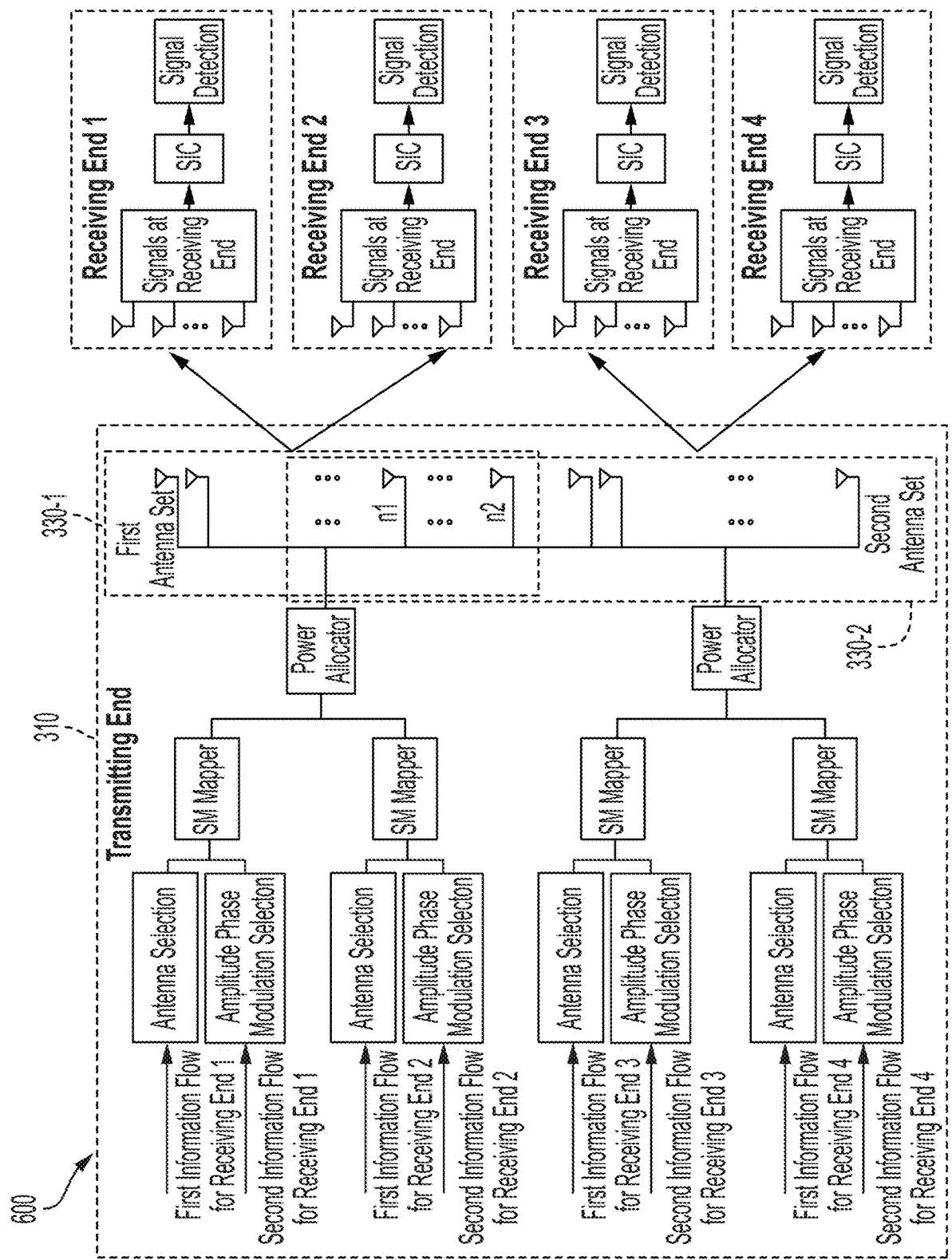
FIG. 7 is a schematic diagram illustrating another example system for applying SM technology for point-to-multipoint transmission, according to an embodiment herein.

In another embodiment, the antennas of the transmitting end can be grouped into two or more antenna sets with at least one antenna is common to the grouped antenna sets (i.e., the antenna sets can at least partly be overlapped), and each antenna set can be dedicated to the SM for one or more receiving ends. In other words, any antenna in each antenna set can be multiplexed for any receiving end in a corresponding set of receiving ends. FIG. 7 is a schematic diagram of the example system for applying the SM technology for point-to-multipoint transmission, according to the embodiments herein. In this example, based on a predetermined mapping rule (e.g., the mapping rule 800), the first portion of information bits for the first receiving end communication device (e.g., the receiving end 1) are mapped to a first antenna in the first antenna set (e.g., the first antenna set 330-1), and the first portion of information bits for the second receiving end communication device (e.g., the receiving end 4) are mapped to a second antenna in the second antenna set (e.g., the second antenna set 330-2), wherein thers is at least one common antenna (e.g., at least one of antennas n1 to n2) in the first set of antennas and the second set of antennas. A first transmission power is allocated to the first receiving end communication device (e.g., the receiving end 1), and a second transmission power is allocated to the second receiving end communication device (e.g., the receiving terminal 2). The second portion of information bits for the first receiving end communication device (e.g., the receiving end 1) is transmitted by the first antenna at the first transmission power, and the second portion of information bits for the second receiving end communication device (e.g., the receiving end 2) is transmitted by the second antenna at the second transmission power. In this example, there is a specific information bit value, such that the first antenna and the second antenna are the same antenna (i.e., at least one of the antennas n1 to n2) if both the first portion of information bits for the first receiving end communication device (e.g., the receiving end 1) and the first portion of information bits for the second receiving end communication device (e.g., the receiving end 2) are equal to the specific information bit value.

In one implementation, there can be at least one antenna that is not common to the first set of antennas and the second set of antennas. In another implementation, the first antenna set and the second antenna set can be a same antenna set, which is actually correspond to the example system in FIG. 3A.

It should be noted that, in this embodiment, similarly to the above, it is necessary to determine in advance the mapping rules that matches with the first antenna set 330-1 and the second antenna set 330-2. Similarly, the mapping rules need to match with the number of antennas in the antenna sets. It is still necessary for the mapping rules to specify correspondences for the multiple receiving ends served by different antenna sets, to ensure that the same bit values for the multiple receiving ends served by different antenna sets can be mapped to antennas in the respective antenna sets. In an implementation, there is a specific information bit value, such that the mapped first antenna and second antenna are the same antenna common to two antenna sets if both the information bits in the first information flow for the receiving end 1 and the information bits in the first information flow for the receiving end 2 are equal to the specific information bit value.

Even if the first antenna set applies a first mapping rule and the second antenna set applies a second mapping rule different from the first one, the first information flows which are the same can still be mapped to an antenna belonging to both the first antenna set and the second antenna set. For example, for the first antenna set, the first information flow "01" for a receiving end is mapped to the antenna, and for the second antenna set, the first information flow "01" for a receiving end is mapped to the antenna. In this case, demodulation rules can be the same for any receivers.

However, for different receivers (in other words, for different antenna sets), the first information flows which are different can be mapped to an antenna belonging to both the first antenna set and the second antenna set antennas. For example, for the first antenna set, the first information flow "01" for one receiving end is mapped to the antenna, and for the second antenna set, the first information flow "10" for another receiving end is mapped to the antenna. In this case, demodulation rules can be different for different receiving ends. For example, the above one receiving end demodulates the sequence number of the antenna into bits 01, and the other receiving end demodulates the sequence number of the antenna into bits 10. It works as long as the mapping rules at both the transmitting end and the receiving end are consistent.

It should be noted that, the transmitting end and the receiving end in FIGS. 6-7 can be implemented by using the above transmitting end communication device 400 and the receiving end communication device 500, respectively. Although the mapping rules can be different, the mapping operations, power allocation operations, and transmission control operations are similar to those described with reference to FIGS. 3A and 4A-5B.

An example of the operation of the transmitting end communication device 400 and the receiving end communication device 500 where the technology of the present disclosure is used will be described below in conjunction with the above description.

In this example, the transmitting end communication device 400 controls to transmit orthogonal training sequences on respective channels for the receiving end communication devices to determine channel state information for each channel, thereby performing spatial modulation and demodulation. By performing channel estimation through transmitting the training sequences (e.g., pilot signals in the LTE system), a channel matrix $H^{(k)}$ from the transmitting end communication device 400 to the kth receiving end (i.e., the receiving end k) can be obtained as:

$$H^{(k)} = [h_1^{(k)} h_2^{(k)} \ldots h_{N_t}^{(k)}], \quad (1)$$

$$h_j^{(k)} = [h_{1,j}^{(k)} h_{2,j}^{(k)} \ldots h_{N_{r_k},j}^{(k)}]^T \quad (2)$$

wherein $h_{i,j}^{(k)}$ denotes the antenna gain from the jth antenna at the transmitting end to the ith antenna in the $N_{r_k}$ antennas at the receiving end k (where $N_{r_k} \geq 1$), it is assumed that $h_{i,j}^{(k)}$ complies with the complex Gaussian independent identical distribution $\mathcal{CN}(0, \sigma_h^2)$ for ease of analysis. Of course, those skilled in the art will appreciate that $h_{i,j}^{(k)}$ can alternatively comply with other distribution conditions different from the complex Gaussian independent distribution $\mathcal{CN}(0, \sigma_h^2)$.

At any time slice, at the transmitting end communication device 400, for any of the K receiving ends, such as the receiving end k, as in the above step 401, the SM mapping unit 402 maps information bits in the first information flow for the receiving end to the corresponding antenna of the $N_t$ antennas based on the predetermined mapping rule, to perform SM for the information bits. Further, as in the above step 407, the transmitting end communication device 400 can further select a corresponding amplitude phase modulation according to channel state information (e.g., CQI (Channel Quality Indicator)) that is feedback by the receiving end (or measured from a reference signal from the receiving end), and transmit the second portion of information bits for the receiving end by using the selected corresponding amplitude phase modulation. For example, in the example of FIG. 3A, information bits in the second information flow for the receiving end are further mapped to particular amplitude phase modulation symbols (i.e., constellation points in the constellation) in a particular amplitude phase modulation scheme, to perform the amplitude phase modulation for the information bits. The total number of amplitude phase modulation symbols in the particular amplitude phase modulation scheme (i.e., the total number of constellation points in the constellation) can be expressed as $M_k$. The particular amplitude phase modulation scheme can depend on channel conditions, such as receiving SNR conditions at the receiving end, where a higher receiving SNR can correspond to a higher order modulation scheme; and vice versa.

After mapping the information bits in the first information flow and the second information flow for the receiving end k to antennas and amplitude phase modulation symbols respectively, the following transmission signal vector is formed:

$$x_{j_k,m_k}^{(k)} \triangleq [0 \ldots s_{m_k} \ldots 0]^T, \text{ wherein } 1 \leq j_k \leq N_t, 1 \leq m_k \leq M_k \quad (3)$$

wherein $j_k$ denotes the sequence number of the mapped antenna, and $m_k$ denotes the sequence number of the mapped amplitude phase modulation symbol in the $M_k$ amplitude phase modulation symbols in the specific amplitude phase modulation scheme. There are $N_t$ elements in the transmission signal vector corresponding to the $N_t$ antennas respectively, and $s_{m_k}$ denotes the mapped amplitude phase modulation symbol per se. The position of $s_{m_k}$ in the above transmission signal vector corresponds to the mapped $j_k$th antenna. In this example, only the mapped antenna is used for signal transmission, and the powers at the other antennas are all zero. It can be seen that in the case where the information bits in the first information flows for two or more receiving ends are the same, these information bits will be mapped to a same antenna, thereby the information bits in the second flows for these two or more receiving ends will be transmitted by the same antenna.

For the receiving end k, the total SM symbols set considering the antenna mapping (or antenna selection) can be written as follows:

$$X^{(k)} = \{x_{j_k,m_k}^{(k)} : 1 \leq j_k \leq N_t, 1 \leq m_k \leq M_k\}, \quad (4)$$

$$|X^{(k)}| = M_k N_t \quad (5)$$

wherein "|•|" denotes the number of elements in the set, and the meaning of equation (5) is there are $M_k N_t$ elements in the above total SM symbols set. It can be seen that the total modulation order of the receiving end k is composed of two parts, that is, the traditional amplitude phase modulation order and the additional modulation order brought by the SM, and the total modulation order can be written as follows:

$$B_k = \log_2(M_k) + \log_2(N_t) \quad (6)$$

It can be seen that, compared to the example system in FIG. 2B where antennas are grouped, the multi-user SM system (e.g., the system 300A) having the transmitting end communication device 400 according to the embodiments herein can achieve more improvement on the additional modulation order, and this improvement on the additional modulation order is comparable to the additional modulation order in the point to point SM system in FIG. 2A.

At the transmitting end communication device 400, as in the above step 403, the power allocation unit 404 allocates transmission power to each receiving end, for example, allocates transmission power $p_k$ to the receiving end k, thereby forming a transmission power allocation result. For example, the transmission power allocation result can include information indicating an absolute value or a relative value of the transmission power allocated to each receiving end. In other examples, the transmission power allocation result can additionally or alternatively include information indicating an order of the transmission power allocated to each receiving end or the demodulation order. The power allocation unit 404 can further inform each receiving end of the transmission power allocation result.

It is worth noting here that it is necessary for the power allocation unit 404 to take into account demands of the SIC operations at the receiving ends to allocate the transmission power. In the system of the embodiments herein, the transmitting end can transmit the transmission signals of multiple receiving ends in a superimposing manner on the same time-frequency resources. Accordingly, each receiving end will need to detect transmission signals for other receiving ends by the SIC, and in turn detect and demodulate the transmission signals for the receiving end per se.

As an example, it is assumed that the transmitting end 310 can communicate with the receiving end 1 via a first physical communication link L1 and with the receiving end k via a second physical communication link Lk. It is assumed that the radio condition of the first physical communication link L1 is poorer (e.g., because the receiving end 1 is farther from the transmitting end 310) and the radio condition of the second physical communication link Lk is better (e.g., because the receiving end k is closer to the transmitting end 310). This situation can be temporary since the radio conditions are constantly changing. In other words, for a particular radio transmission power, the signal-to-interference-noise ratio SINR and carrier-to-interference C/I ratio at the receiving end 1 is lower (or much lower) than the corresponding SINR and C/I ratio at the receiving end k. If the relative radio conditions of the two receiving end 1 and the receiving end k are known, the transmitting end 310 can proportionally allocate the transmission power budget between the two receiving ends for a particular time slice and a particular carrier frequency, such that a first modulation symbol of the receiving end 1 (the receiving end under poorer radio condition) is transmitted at higher transmission power than the power for transmitting a second modulation symbol of the receiving end k (the receiving end under better radio conditions).

Thus, given the current radio conditions and additional interference caused by transmitting the second modulation symbol to the receiving end k, the transmitting end 310 can allocate sufficient power for transmitting the first modulation symbol of the receiving end 1, enabling the receiving end 1 to decode the first modulation symbol. The transmitting end 310 can then allocate less power for transmitting the second modulation symbol of the receiving end k, but the less power is still sufficient for the receiving end k to cancel or reduce the interference caused by the transmission of the first modulation symbol and to decode the second modulation symbol. The transmitting end 310 then transmits the two modulation symbols on the same time-frequency resources, such that the two modulation symbols can be considered to collide with each other. However, since the first modulation symbol is transmitted at the higher power than the power for transmitting the second modulation symbol, the second modulation symbol can just appear as noise or interference increasement for the receiving end 1. If the power offset between transmitting the two modulation symbols is sufficiently high, the degradation of the SINR or C/I ratio at the receiving end 1 can be small or even insignificant.

Therefore, if the first modulation symbol is transmitted with a sufficiently high power with respect to the transmission rate of the first modulation symbol, the current radio conditions and the additional interference caused by the transmission of the second modulation symbol, the receiving end 1 should be able to demodulate the first modulation symbol. Moreover, since the radio condition of the receiving end k is better, the receiving end k can receive the first modulation symbol at a higher SINR or C/I ratio than the receiving end 1, so the receiving end k should also be able to demodulate the first modulation symbol (in one example, the receiving end k can be aware of the modulation scheme of the first modulation symbol). Once the receiving end k demodulates the first modulation symbol, the receiving end k can process it as interference, and use interference cancellation techniques to cancel the interference from the overall transmitted signals received during reception of the first and second modulation symbols. The residual signal obtained after cancelling the interference can represent the second modulation symbol combined with noise and interference from other sources. If the second modulation symbol is transmitted with a sufficiently high power (but lower than the power used to transmit the first modulation symbol) with respect to the transmission rate of the second modulation symbol and the radio conditions of the receiving terminal k, the receiving end k should be able to demodulate the second modulation symbol.

It should be understood that the above interference cancellation process can be extended to more receiving ends, for example more than three receiving ends. In particular, the highest power can be allocated for transmission to a receiving end under the worst radio condition, the lowest power can be allocated for transmission to a receiving end under the best radio condition, and the intermediate power can be allocated for transmission to a receiving end under the intermediate radio condition. The receiving end under the best radio condition can then demodulate the modulation symbols intended for the receiving end under the worst radio condition and cancel the interference of the demodulated symbols from the received signal, then demodulate the modulation symbols intended for the receiving end under the intermediate radio condition and cancel the interference of the demodulated symbol, and finally demodulate the modulation symbols intended for itself, this demodulating/cancelling process can be referred to as serial interference cancellation (SIC). Likewise, the receiving end under the intermediate radio condition can demodulate the modulation symbol intended for the receiving end under the worst radio condition, cancel interference of the demodulated symbol from the received signal, and then demodulate the modulation symbol intended for itself. The receiving end under the worst radio condition can directly demodulate the modulation symbols intended for itself, since this modulation symbol is transmitted at the highest power. It will be appreciated that those skilled in the art will be able to extend the SIC techniques to four or more receivers without the need for additional testing or further inventive work. It should also be understood that the order of the transmission power allocated to a particular receiving end can correspond to the demodulation order of the receiving end in performing the SIC. In general, the demodulation order of the receiving end to which a higher transmission power is allocated can be in front relative to other receiving ends.

In this example, the power allocation unit 404 allocating the first transmission power to the first receiving end communication device and the second transmission power to the second receiving end communication device can include calculating the transmission power allocation result according to the transmission power allocation principle. It will be apparent to those skilled in the art that such transmission power allocation is to ensure the receiving ends to perform the SIC. As described above, the transmission power allocation principle can include one or more of the following: allocating a lower transmission power to a receiving end communication device closer to the transmitting end; allocating a lower transmission power to a receiving end communication device with higher receiving SNR; allocating a higher transmission power to a receiving end communication device with a higher data rate demand; and causing the receiving SNRs of all receiving end communication devices to be at the same level. These transmission power allocation principles are described below in detail.

Receiving SNR Principle

The receiving end feeds back the receiving SNR information to the transmitting end, the transmitting end allocates more power to the user with lower receiving SNR, and allocates less power to the user with higher receiving SNR. In this way, the receiving end with lower receiving SNR can realize data demodulation by a smaller number of SIC operations, and the receiving end with higher receiving SNR can cancel interference of other receiving ends by the SIC operation, demodulate data of its own. This principle is the same as the power allocation principle described in the above embodiments.

Distance Principle

The distance principle is to allocate lower transmission power to the receiving end communication device closer to the transmitting end and higher transmission power to the receiving end communication device farther from the transmitting end. In general, when conditions such as interference or the like are substantially the same, the larger the distance from the receiving end to the transmitting end is, the lower the receiving power at the receiving end is, and the lower the receiving SNR is; the smaller the distance from the receiving end to the transmitting end is, the higher the receiving power at the receiving end is, and the higher the receiving SNR is. Therefore, the distance from the receiving end to the transmitting end can be regarded as an indicator that can reflect the receiving SNR at the receiving end. If the distance information is known, the distance principle can be used as an additional or alternative principle to the principle of receiving SNR.

Data Rate Requirement Principle

The receiving end can first feed back the data transmission requirement to the transmitting end, and the transmitting end can perform power allocation to multiple receiving ends according to factors such as requirement and priority level of the receiving end. For example, for a receiving end that requires a higher data transmission rate, the transmitting end can allocate more power to support a higher phase amplitude modulation order to increase the data transmission rate.

Fairness Principle

The receiving end can first feed back the receiving SNR to the receiving end, and the receiving end can make the final receiving SNR of the multiple receiving ends tend to be equal by performing power allocation, thereby realizing the principle of service fairness between the multiple receiving ends.

The embodiments are not limited by the power allocation principle, and those skilled in the art can formulate other power allocation principles according to specific target requirements, and the corresponding solutions still fall within the scope of the disclosure.

It should be understood that power allocation, for multiple receiving ends according to different power allocation principles, is actually to solve an optimization problem with different objectives, such as minimizing the average bit error rates (BER) of all receiving ends, minimizing the maximum BER of all receiving ends, making the receiving SINR of all receiving ends equal, and so on. This optimization problem can be expressed as:

$$\{p_1, p_2, \cdots, p_K\} = \underset{p_1, p_2, \cdots, p_K}{\operatorname{argmin}} f(p_1, p_2, \cdots, p_k), \qquad (7)$$

wherein f(•) denotes the objective function, arg min f(•) denotes the value of the variable ($p_1$, $p_2$, . . . $p_K$) that minimizes f(•). As an alternative to directly solving this optimization problem, for example, a multi-grid search (MGS) can be used to obtain a numerically approximate optimal solution with relatively low complexity. In particular, the total power can be divided into N shares (e.g., averaged into N shares), and the MGS traverses all possible allocation patterns. It can be seen that as the grid value 1/N decreases, the performance of the numerical solution can be improved, but at the same time the computational complexity is increased. For the simple case where K=2, N=10, the MGS method traverses $p_1$ from 1/N to (N−1)/N and traverses all (N−1) possible allocation patterns. Considering a descending order of the power, i.e. $p_1 > p_2$, the searching load can be halved.

For a certain optimization objective, the MGS method can derive specific power allocation values according to equation (7). However, as the grid value decreases or the number of receiving ends increases, the complexity of the MGS method will increase rapidly. The present disclosure also provides a low complexity and efficient power allocation method, which particularly takes into account phenomenon that when calculating an average BER of all K receiving ends, the BER is mainly from the receiving end with the lowest receiving SINR (i.e., the receiving end with the lowest receiving SINR may become the bottleneck), thus set an optimization target of making the receiving SINRs of all receiving ends equal. Under the constraint of the total amount of power at the transmitting end, the method calculates the power to be allocated to each receiving end by making the receiving SINRs of all receiving ends equal.

The above method expresses the receiving SINR at each receiving end as a function of the power to be allocated, makes the receiving SINRs equal, and solves the equation for the power to be allocated to each receiving end under the constraint of the total power amount at the transmitting end. An example process of the method can be as follows.

When calculating the average BER for all K receiving ends, the BER is mainly from the receiving end with the lowest receiving SINR. At the receiving end k, the receiving SINR after performing the SIC can be expressed as:

$$SINR_k \approx \frac{\| \sqrt{p_k}\, h_{jk}^{(k)} s_{m_l} \|_F^2}{\sum_{l=k+1}^{K} \| \sqrt{p_l}\, h_{jk}^{(k)} s_{m_l} \|_F^2 + \sigma_n^2 N_r} \approx \frac{p_k}{\sum_{l=k+1}^{K} p_l + \sigma_n^2}. \tag{8}$$

Wherein the number of receiving antennas at the receiving end k is $N_r$, and the noise vector is denoted as $N_k \sim \mathcal{CN}(0, \sigma_k^2)$. The "$\approx$" in the first line of formula (8) is in consideration that the signals for the receiving ends ranking in front may not be cancelled completely. Considering the optimization objective of making the receiving SINRs of all receiving ends equal, the following results are obtained:

$$\frac{p_1}{\sum_{l=2}^{K} p_l + \sigma_N^2} = \frac{p_2}{\sum_{l=3}^{K} p_l + \sigma_n^2} = \cdots = \frac{p_K}{\sigma_n^2} \tag{9}$$

Then, the power $p_k$ allocated to the receiving end k can be expressed as:

$$p_k = p_{k+1} \frac{\sum_{l=k+1}^{K} p_l + \sigma_n^2}{\sum_{l=k+2}^{K} p_l + \sigma_n^2} \tag{10}$$

In a specific implementation, it can be assumed at first that $p_K = \alpha$, and then $p_{(K-1)}, p_{(K-2)}$ until $p_1$ are sequentially calculated according to the above formula. Thereafter, the value of the normalization parameter a is determined by the power constraint condition $\Sigma_{k=1}^{K} p_k = 1$. Finally, the specific power allocation values are obtained as follows:

$$p_k = \begin{cases} \alpha, & k = K \\ p_{k+1} \frac{\sum_{l=k+1}^{K} p_l + \sigma_n^2}{\sum_{l=k+2}^{K} p_l + \sigma_n^2}, & 1 \leq k < K \end{cases} \tag{11}$$

Compared to the multi-dimensional grid search, this power allocation method with low complexity proposed here can directly calculate the power allocation parameters. The performances of the two methods will be compared in the following simulation analysis.

It should be noted that the above power allocation process can calculate the power allocation result in real time according to the states of the receiving ends in the system, or can pre-calculate in the offline mode and store the power allocation result in a configuration table. Accordingly, in one embodiment, the transmission power allocation result is pre-calculated according to a particular transmission power allocation principle and stored for performing the transmission power allocation; in another embodiment, the transmission power allocation result is calculated in real time to perform transmission power allocation. Therefore, the transmitting end can read power allocation parameters from the preset system information table, and/or can select to adjust the power allocation in real time through user feedback information, which depends on processing capability of the transmitting end. It can be seen that off-line computing can reduce computational load at the transmitting end compared to real-time computing.

At the transmitting end communication device 400, as in the above step 405, the transmission control unit 406 can control to transmit the second portion of information bits for each receiving end by the antenna mapped by the SM mapping unit 402 at the transmission power allocated by the power allocating unit 404.

In particular, in FIG. 3A, the transmission signal vectors of the K receiving ends are superimposed and transmitted by the mapped antenna, and the final total transmission signal can be written as:

$$x_{sum} = \Sigma_{k=1}^{K} \sqrt{p_k} * x_{j_k, m_k}^{(k)}, \Sigma_{k=1}^{K} p_k = 1 \tag{12}$$

Heretofore, the operations of the transmitting end communication device 400 in the examples where the technology herein is applied has been described in detail. The corresponding operations of the receiving end communication device 500 in these examples will be described in detail below.

At the receiving end communication device 500, the detection unit 504 can perform the SIC on the transmission signal received from the transmitting end, to detect signals for other receiving end communication devices and cancel the signals as interference, until the signal for the receiving end communication device 500 per se is detected, wherein the signal for the receiving end communication device 500 per se can include the modulation symbol for the communication device and the sequence number of the antenna which transmitted the received transmission signal. Here, the sequence number of the antenna can be detected based on channel state information, which information is determined by the receiving end communication device 500 based on the training sequences transmitted by the antenna. The detailed process of SIC can be referred to the following description, for example, with respect to FIGS. 9-10. Furthermore, the receiving end communication device 500 can receive information indicating the order of the transmission power used by the first antenna in transmitting the signal for the receiving end per se among the transmission powers used in transmitting signals for all receiving end communication devices or the order of demodulation, wherein the number of SIC performed depends on the order or the order of demodulation.

The spatial demodulation mapping unit 502 can map the sequence number of the antenna which transmitted the received transmission signal to the first portion of information bits for the receiving end communication device 500 per se based on the predetermined mapping rule (e.g., the predetermined mapping rule 800 of the example shown in FIG. 8), and map the modulation symbols for the communication device to the second portion of information bits for the receiving end according to the respective amplitude phase modulation method. Here, the first portion of information bits can correspond to bit information in the first information flow for the receiving end in FIGS. 3A-3C and FIGS. 6-7, and the second portion of information bits can correspond to bit information in the second information flow for the receiving end in FIGS. 3A-3C and FIGS. 6-7.

The process of the SIC according to embodiments herein will be described below with reference to FIGS. 9-10.

It is assumed that at the kth receiving end k in FIG. 3A, the transmission signal received from the transmitting end 310 can be written as follows:

$$y^{(k)} = \sqrt{p_k} H^{(k)} \Sigma_{l=1}^{K} \sqrt{p_l} * x_{j_l, m_j}^{(l)} + n_k = \sqrt{p_k} \Sigma_{l=1}^{K} \sqrt{p_l} * h_{j_l}^{(k)} s_{m_l} + n_k \tag{13}$$

wherein $\rho_k$ denotes the receiver gain of the receiving end k, and $n_k \sim \mathcal{CN}(0, \sigma_k^2)$ denotes the noise vector, then the receiving SNR at the receiving end k can be expressed as $$SNR_k = 10\log_{10}\frac{\rho_k}{\sigma_k^2}.$$

According to the above idea of SIC, it is assumed that the transmitting end is transmitting to K receiving ends, i.e. the receiving end 1 to the receiving end K, and for the receiving end k, it is necessary to first detect the signals for the receiving ends to which higher transmission powers is allocated than to per se and cancel them as interference, and then its own signal is detected and demodulated. In one embodiment, the receiving end detects signals for other receiving ends by using detection algorithms in the SIC, and the detection algorithm can include detection algorithm, such as Maximum Likelihood (ML) or Maximum Ratio Combining (MRC).

For convenience of description, it is assumed here that the transmission power allocation result is expressed as $p_1 > p_2 > \ldots > p_K$, that is, the amount of transmission power allocated is ranked in descending order of the receiving end number. The following describes how to use the ML algorithm and the MRC algorithm for signal detection and demodulation, respectively, with reference to the signal detection methods at the receiving end shown in FIGS. 9 and 10.

Figure 9:
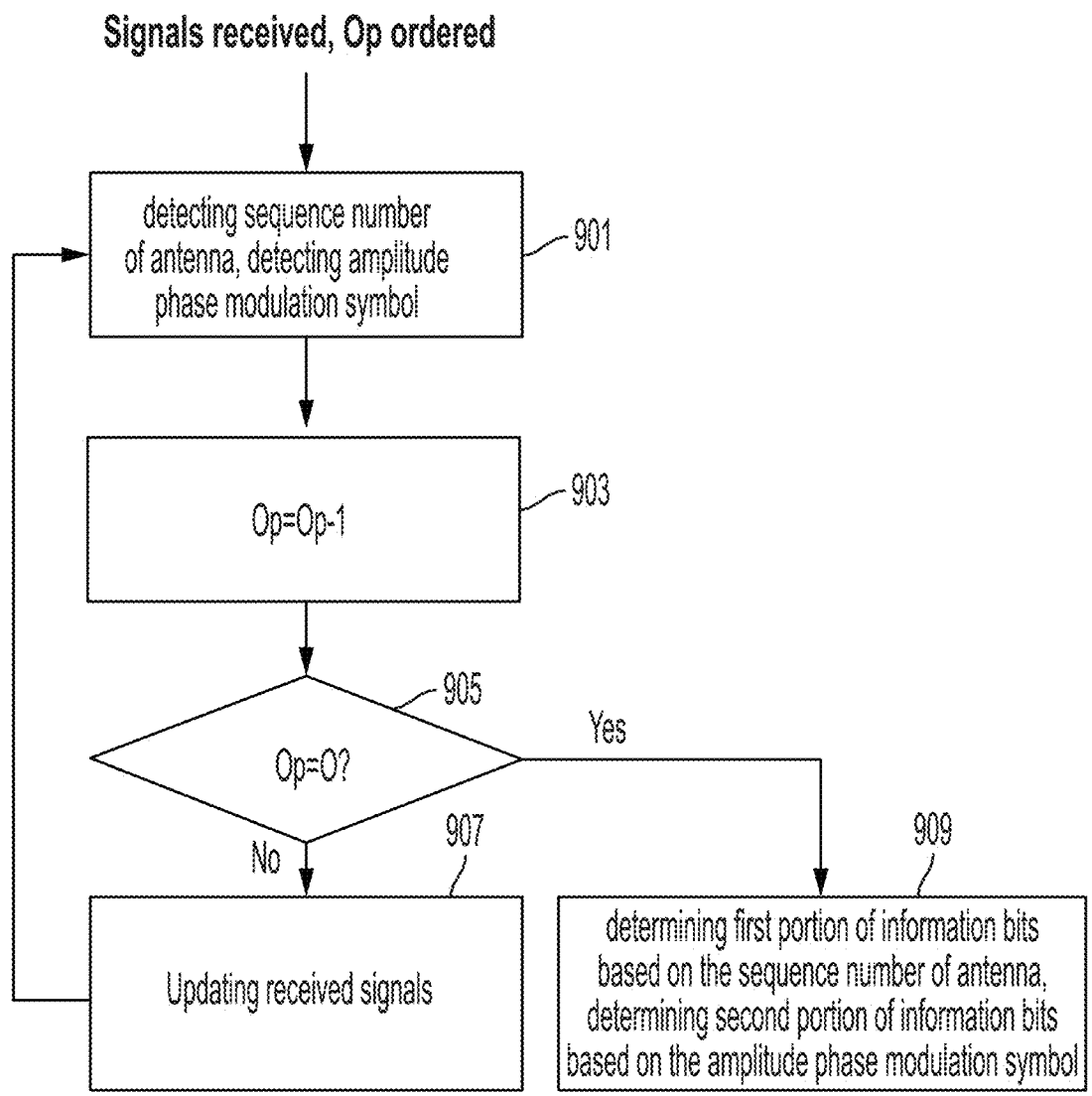
FIG. 9 is a flowchart illustrating an exemplary method of performing signal detection at a receiving end by using a Maximum Likelihood (ML) algorithm, according to an embodiment herein.

ML Algorithm:

FIG. 9 is a flow chart illustrating an exemplary method of performing signal detection at a receiving end by using the ML algorithm, according to an embodiment herein. The ML algorithm is an optimal detection algorithm, and the detailed idea of the algorithm is as follows. For the receiving end 1 with the highest allocated power, the sequence number of the antenna for the receiving end and the index of the amplitude phase modulation symbol can be detected from the received signal $y^{(1)}$ according to the following formula:

$$[\hat{j}_{1,ML}, \hat{m}_{1,ML}] = \underset{j_1, m_1}{\mathrm{argmax}}\, p_Y(y^{(1)} \mid x^{(1)}_{j_1, m_1}, H^{(1)}) \qquad (14)$$

$$= \underset{j_1, m_1}{\mathrm{argmin}}\| y^{(1)} - \sqrt{\rho_1 p_1}\, h^{(1)}_{j_1} s_{m_1} \|_F^2$$

wherein $\hat{j}_{1,ML}$ denotes the sequence number of the antenna for the receiving end, $\hat{m}_{1,ML}$ denotes the index of the amplitude phase modulation symbol, and $p_Y(y^{(1)}|x_{j_1,m_1}^{(1)}, H^{(1)})$ denotes the probability density function, $\|\bullet\|_F$ denotes the Frobenius norm. It can be understood that the processing of formula (14) is an exhaustive search for the combinations of the channel gains from multiple antennas in the set of antennas at the transmitting end to the receiving end and the modulation symbols in a particular modulation scheme, to find a combination of channel gain and modulation symbol that best approximates the received signal $y^{(1)}$. Next, bit information in the first information flow for the receiving end 1 can be determined based on the above antenna sequence number according to the predetermined mapping rule, and bit information in the second information flow for the receiving end 1 can be determined based on the amplitude phase modulation symbol.

For the receiving end k, it is necessary to detect signals for the first (k−1) receiving ends to which higher powers are allocated (i.e., the receiving ends rank in front in the transmission power allocation resul) from the received signals based on the order of the receiving end in the transmission power allocation result, and to cancel the signals as interference. In particular, the signal for the first receiving end 1 is detected from the received signal based on the following formula:

$$[\hat{j}_{1,k,ML}, \hat{m}_{1,k,ML}] = \underset{j_1, m_1}{\mathrm{argmax}}\, p_Y(y^{(k)} \mid x^{(1)}_{j_1, m_1}, H^{(k)}) \qquad (15)$$

$$= \underset{j_1, m_1}{\mathrm{argmin}}\| y^{(k)} - \sqrt{\rho_1 p_1}\, h^{(k)}_{j_1} s_{m_1} \|_F^2$$

It can be understood that the processing in formula (15) is an exhaustive search for the combinations of the channel gains from multiple antennas in the set of antennas at the transmitting end to the receiving end and the modulation symbols in the particular modulation scheme, to find a combination of channel gain and modulation symbol that best approximates the received signal $y^{(k)}$.

It should be noted that $[\hat{j}_{1,k,ML}, \hat{m}_{1,k,ML}]$ here is obtained based on the signal $y^{(k)}$ received by the receiving end k, which is different from $[\hat{j}_{1,ML}, \hat{m}_{1,ML}]$ obtained based on the above signal $y^{(1)}$ received by the receiving end 1. Then, the interference caused by the receiving end 1 is cancelled from the received signal as follows:

$$y_1^{(k)} = y^{(k)} - \sqrt{\rho_k p_1}\, h^{(k)}_{\hat{j}_{1,k,ML}} s_{\hat{m}_{1,k,ML}} \qquad (16)$$

Then, the signal for a second receiving end is detected from the updated received signal based on the following formula:

$$[\hat{j}_{2,k,ML}, \hat{m}_{1,k,ML}] = \underset{j_2, m_2}{\mathrm{argmax}}\, p_Y(y^{(k)} \mid x^{(1)}_{j_2, m_2}, H^{(k)}) \qquad (17)$$

$$= \underset{j_2, m_2}{\mathrm{argmin}}\| y^{(k)} - \sqrt{\rho_1 p_1}\, h^{(k)}_{\hat{j}_{1,k,ML}} s_{\hat{m}_{1,k,ML}} - \sqrt{\rho_k p_2}\, h^{(k)}_{j_2} s_{m_2} \|_F^2$$

Then, the received signal is updated again until the interference caused by the (k−1)th receiving end is cancelled, and the final updated received signal is:

$$y_{k-1}^{(k)} = y^{(k)} - \sqrt{\rho_k} \sum_{l=1}^{k-1} \sqrt{p_l}\, h^{(k)}_{\hat{j}_{1,k,ML}} s_{\hat{m}_{1,k,ML}} \qquad (18)$$

Finally, the receiving end k detects the signal for itself according to the following formula:

$$[\hat{j}_{k,ML}, \hat{m}_{k,ML}] = \underset{j_k, m_k}{\mathrm{argmax}}\, p_Y(y^{(k)} \mid x^{(1)}_{j_k, m_k}, H^{(k)}) \qquad (19)$$

$$= \underset{j_k, m_k}{\mathrm{argmin}}\| y^{(k)} - \sqrt{\rho_k} \sum_{l=1}^{k-1} \sqrt{\rho_l}\, h^{(k)}_{\hat{j}_{1,k,ML}} s_{\hat{m}_{1,k,ML}} - \sqrt{\rho_k p_k}\, h^{(k)}_{j_k} s_{m_k} \|_F^2$$

The bit information in the first information flow for the receiving end k can be determined based on the antenna sequence number according to the predetermined mapping rule, and the bit information in the second information flow for the receiving end k can be determined based on the amplitude phase modulation symbol. Since the ML algorithm requires an exhaustive search for the set of spatial modulation symbols as shown in formula (4), the computational complexity is related to the product of $M_k$ and $N_t$.

According to the above idea of the ML algorithm, the example method of signal detection at the receiving end in FIG. 9 operates as follows. For the received signal of any receiving end, make an initial value of Op equal to the order of the receiving end in the transmission power allocation result or to the demodulation order, and at block 901, the sequence number of the antenna and the amplitude phase modulation symbol for a receiving end to which the highest transmission power is allocated in the received signal is simultaneously detected. Here, if the power allocation is the highest in the transmission power allocation, the initial value of Op is 1, and the initial value of Op is incremented as the allocated transmission power is decremented. In one embodiment, the sequence number of the antenna can be detected based on corresponding channel state information, which information is determined by the receiving end communication device 500 based on the training sequences transmitted by the corresponding antenna. At block 903, the value of rank Op is decremented by one. At block 905, it is determined if the value of Op is zero. If the value of Op is 0, it indicates that there is no need to perform interference cancellation on the received signal or interference cancellation has been completed for the received signal, the method proceeds to block 909; otherwise, it indicates there is still need to cancel interferences from the receiving end with higher transmission power allocation, and the method proceeds to the block 907. At block 907, the signal for the receiving end with the highest transmission power allocated can be cancelled from the received signal as interference to obtain an updated received signal. Next, the method returns to block 901 where the operations of blocks 901-905 are performed again for the updated received signal and the updated order Op. At block 909, based on the sequence number of antenna most recently detected at block 901, bit information in the first information flow for the receiving end is determined according to the predetermined mapping rule, and based on the modulation symbol most recently detected at block 901, bit information in the second information flow for the receiving end is determined.

Figure 10:
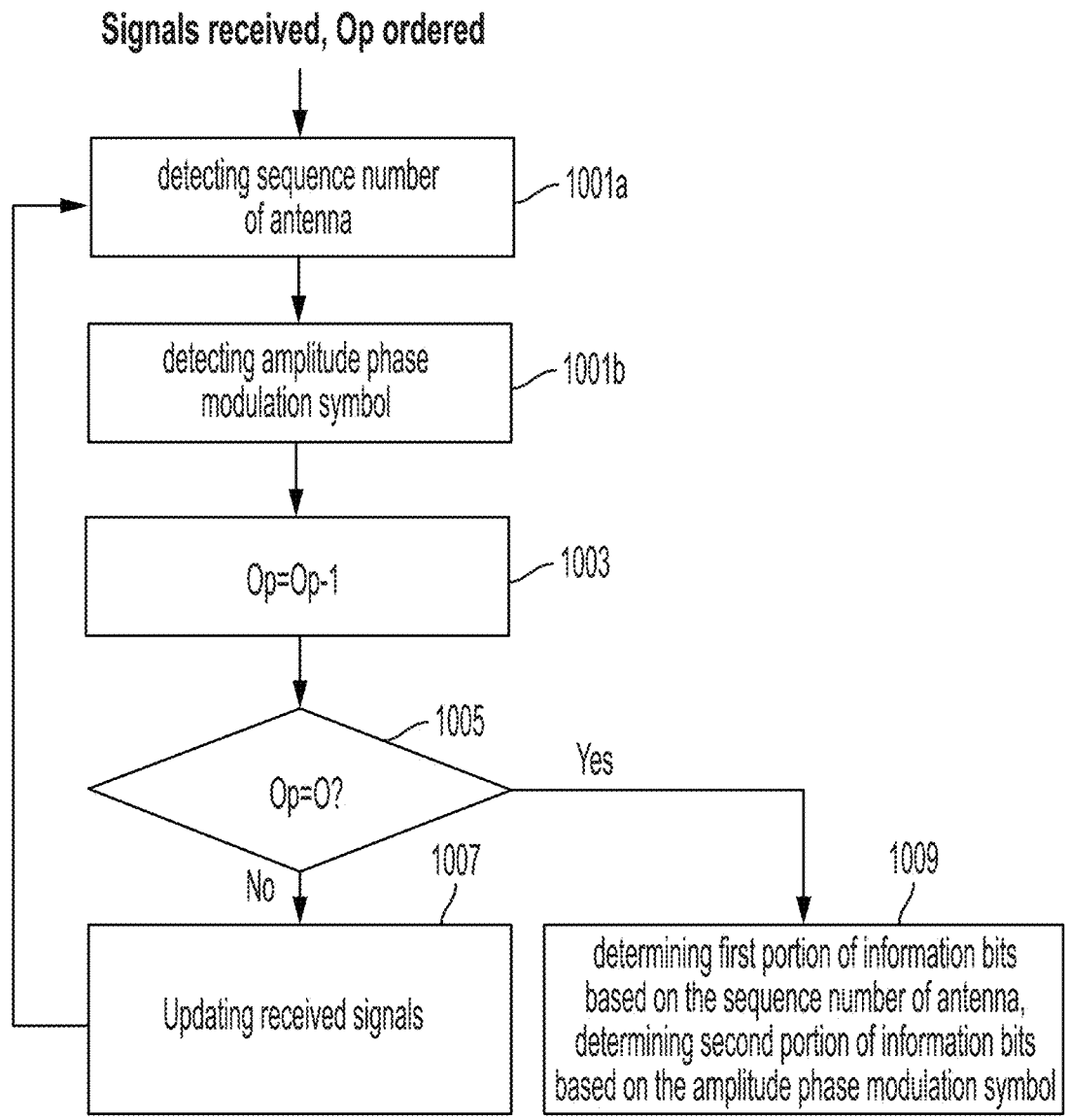
FIG. 10 is a flowchart illustrating an exemplary method of performing signal detection at the receiving end by using a Maximum Ratio Combining (MRC) algorithm, according to an embodiment herein.

MRC Algorithm:

FIG. 10 is a flow chart illustrating an exemplary method of signal detection at the receiving end by using the MRC algorithm, according to an embodiment herring. The MRC algorithm is a sub-optimal detection algorithm that can replace the ML algorithm. In the MRC algorithm, it is necessary to first detect the sequence number of antenna for the receiving end, and then detect the amplitude phase modulation for the receiving end with the sequence number of the antenna being known, which is different from the ML algorithm where the sequence number of antenna and the amplitude phase modulation symbol for the receiving end are detected at the same time. Taking cancellation of the signal for the first receiving end 1 as interference from the received signal at the receiving end k as an example, for the receiving end k, firstly, an exhaustive search is done on the channel gains from the multiple antennas in set of antennas at the transmitting end to the receiving end, the sequence number of antenna for the first receiving end 1 is detected from the received signal by using the following formula:

$$\hat{j}_{1,k,MRC} = \operatorname{argmax}_{j_1} \frac{[h_{j_1}^{(k)}]^H y^{(k)}}{\sqrt{\rho_k p_1} \, \|h_{j_1}^{(k)}\|_F^2} \quad (20)$$

Then, with the sequence number $\hat{j}_{1,k,MRC}$ of the antenna being known, an exhaustive search is done on the modulation symbols in the particular modulation scheme, and the amplitude phase modulation symbol for the first receiving end 1 is detected based on the following formula.

$$\hat{m}_{1,k,MRC} = \operatorname{argmin}_{m_1} \left| s_{m_1} - \frac{[h_{\hat{j}_1,k,MRC}^{(k)}]^H y^{(k)}}{\sqrt{\rho_k p_1} \, \|h_{\hat{j}_1,k,MRC}^{(k)}\|_F^2} \right| \quad (21)$$

In addition to the above differences, other processings of the MRC algorithm is similar to that described with reference to the ML algorithm and will not be repeated here. Since the MRC algorithm detects separately the sequence number of antenna and the amplitude phase modulation symbol for the receiving end, the computational complexity is related to the sum of $M_k$ and $N_t$.

The method of signal detection at the receiving end according to the idea of the MRC algorithm is shown in FIG. 10. In the method of FIG. 9, the sequence number of antenna and the amplitude phase modulation symbol for the receiving end are simultaneously detected at block 901. In contrast, the method illustrated in FIG. 10 completes detection of the sequence number of antenna and the amplitude phase modulation symbol for the receiving end with the highest transmission power allocated in the received signals at blocks 1001a and 1001b, respectively. Except for the above differences, the other processings in FIG. 10 are similar to those described with reference to FIG. 9, and will not be repeated here.

Of course, in other embodiments, those skilled in the art can also use other detection algorithms to perform the above-mentioned SIC, which will not be described in detail herein.

In order to further facilitate the understanding of the SM technology herein, the signaling interaction process between the transmitting end and the receiving end will be described below with reference to FIG. 11 in detail.

Figure 11:
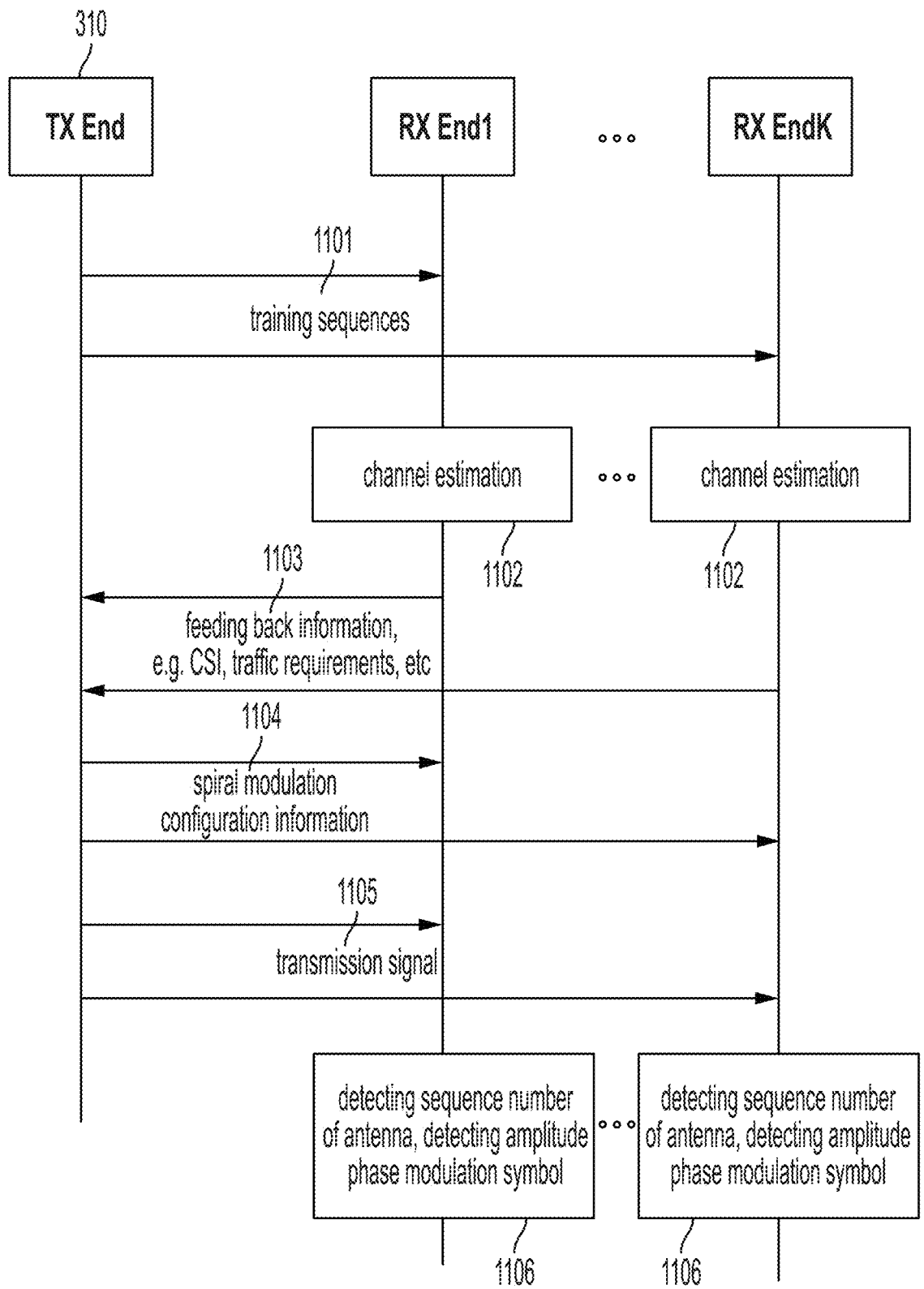
FIG. 11 is a flow diagram illustrating an example process of signal interaction for applying SM technology for point-to-multipoint transmission, according to an embodiment herein.

FIG. 11 shows a flow diagram of an example process of signaling interaction for applying point-to-multipoint transmission using the SM technology. In particular, at step 1101, the transmitting end 310 controls to transmit, by using the respective antennas on the corresponding channels, orthogonal training sequences (such as pilot signals) to the receiving end 1 to the receiving end K, for the receiving end (e.g., the first receiving end communication device and the second receiving end communication device) to determine channel state information of each channel, thereby performing the spatial modulation and demodulation. At step 1102, each receiving end performs channel estimation based on the received training sequences to determine channel state information (e.g., SNR or C/I ratio) for each channel, and at step 1103 feeds back information to the transmitting end, including channel state information and traffic requirements, etc. The transmitting end 310 can determine radio conditions for each receiving end based on the feedback information, thereby performing the above-mentioned transmission power allocation and determining the amplitude phase modulation scheme. In one embodiment, the transmitting end 310 can control to transmit orthogonal training sequences on the respective channels, for the receiving ends 1 to K to determine channel state information for each channel, thereby performing spatial modulation and demodulation. Accordingly, the receiving ends 1 to K can detect the sequence number of the antenna based on the channel state information. In another embodiment, the transmitting end 310 can select a corresponding amplitude phase modulation scheme according to the channel state information of the receiving ends 1 to K, and transmit information bits in the second flow for the receiving ends 1 to K by using the selected corresponding amplitude phase modulation scheme. Accordingly, the receiving ends 1 to K can receive information on the amplitude phase modulation scheme from the transmitting end 310, and determine information bits in the second information flow for the receiving end itself by using the amplitude phase modulation scheme indicated by the information on the amplitude phase modulation scheme.

At step 1104, the transmitting end 310 transmits the spatial modulation configuration information to the receiving ends 1 to K, and the spatial modulation configuration information can include, for example, the transmission power allocation result and the amplitude phase modulation scheme information described above. In one embodiment, the transmission power allocation result can be just the order of the power allocated to each receiving end or the demodulation order. At step 1105, the transmitting end transmits the non-orthogonal spatial modulated transmission signal to the receiving ends 1 to K, and the transmission signal can be a final total transmission signal formed by superimposing the transmission signal vectors for the respective receiving ends. At 1106, each receiving end detects the sequence number of antenna and the amplitude phase modulation symbol by the SIC, and further determines information bits for the receiving end. In an embodiment, the receiving ends 1 to K can receive information indicating the order of the transmission power used in transmitting the signal for the receiving end itself among the transmission powers used for transmitting signals for all receiving ends, wherein the number of times the SIC operation performs can depend on the order. The process of SIC can be referred to the above description, for example, with respect to FIGS. 9-10, and will not be repeated here.

According to the non-orthogonal multi-user SM technology of the present disclosure, by multiplexing the antennas at the transmitting end to perform SM for multiple receiving ends at the same time, the additional modulation order obtained by each receiving end and the data transmission rate are increased. From another perspective, the non-orthogonal multi-user SM technology according to the present disclosure can improve the demodulation performance of the receiving end while maintaining the same data transmission rate. It should be understood that the above transmitting end communication device 400 and other implementations of the communication device 400 (e.g., base stations) can also have the ability to perform orthogonal spatial modulation. The transmitting end communication device 400 can dynamically determine whether to enable the non-orthogonal spatial modulation according to the embodiment herein as desired, to obtain the above performance improvement. For example, the non-orthogonal spatial modulation is enabled only when data transmission resources are tight or user traffic delay requirements are strict. Accordingly, the transmitting end communication device 400 can include a switch unit, and control whether or not to enable the non-orthogonal spatial modulation by the switch unit. In one embodiment, the transmitting end communication device 400 can further control to switch between the example implementations shown in FIGS. 3A, 6-7 and other possible alternatives by the switch unit.

The improvement of the performance of the communication system brought by the technology of the present disclosure will be described below with reference to the performance simulation results shown in FIGS. 12A to 12D.

The Monte Carlo random method is used here to perform a simulation experiment. Through $10^6$ random channel simulations, the performance curve of the average bit error rate (BER) relative to the receiving SNR of the receiving antenna is plotted. The specific idea is: firstly, the objective function is set as making the average BER of multiple receiving ends lowest, and an approximate optimal point in power allocation between multiple receiving ends is obtained by using the multi-dimensional grid search (MGS); then the relationship between the average BER and the receiving SNR at the receiving end is plotted. The simulation parameters and simulation results are described in detail below with respect to two simulation scenarios.

Scenario with 2 Receiving Ends

For the scenario with two receiving ends, the number of receiving ends is K=2. The approximate optimal power allocation point is first determined by grid search. The system parameters are set as follows: the number of antennas $N_t$=4, the number of receiving antennas $N_{r1}$=$N_{r2}$=8, the total spatial modulation order $B_1$=$B_2$=3, the number of the amplitude phase modulation symbols $M_1$=$M_2$=2 (i.e., BPSK). The power allocation is performed with the objective of making the average BER of the two receiving ends lowest. It is assumed that the receiving SNRs of the receiving ends are the same, that is, $SNR_1$=$SNR_2$. Since the receiving SNRs of the two receiving ends are equal, it is assumed that the power allocated to the receiving end 1 is greater than the power allocated to the receiving end 2, that is, $p_1$>$p_2$, $p_1$+$p_2$=1. By dividing the interval $p_1 \in [0.5, 1]$ into 25 sampling points, considering the cases of three different receiving SNRs, that is, $$10\log_{10}\frac{\rho_k}{\sigma_k^2} = 5,$$

Figure 12A:
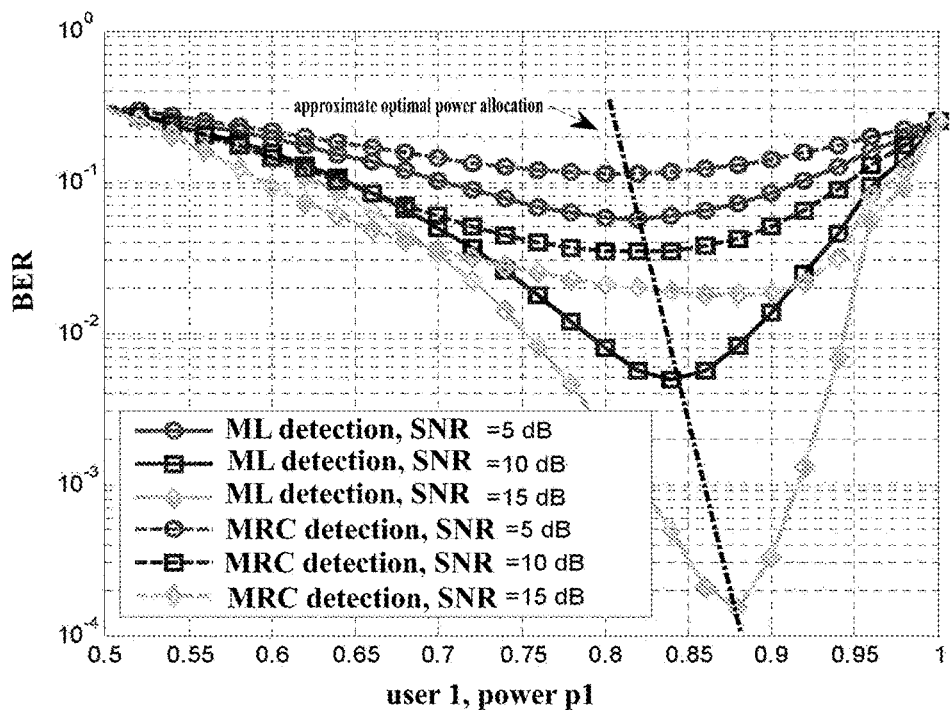
FIGS. 12A to 12D are schematic diagrams illustrating bit error rate performance of point-to-multipoint transmission by SM technology, according to an embodiment herein.

10.15 dB, grid search is performed for performance of various power allocations. The simulation results are shown in FIG. 12A, and the straight dashed line gives an approximate optimal power allocation configuration. This power allocation information can be calculated in real time, or can be pre-calculated in an offline mode and stored in the configuration table.

Figure 12B:
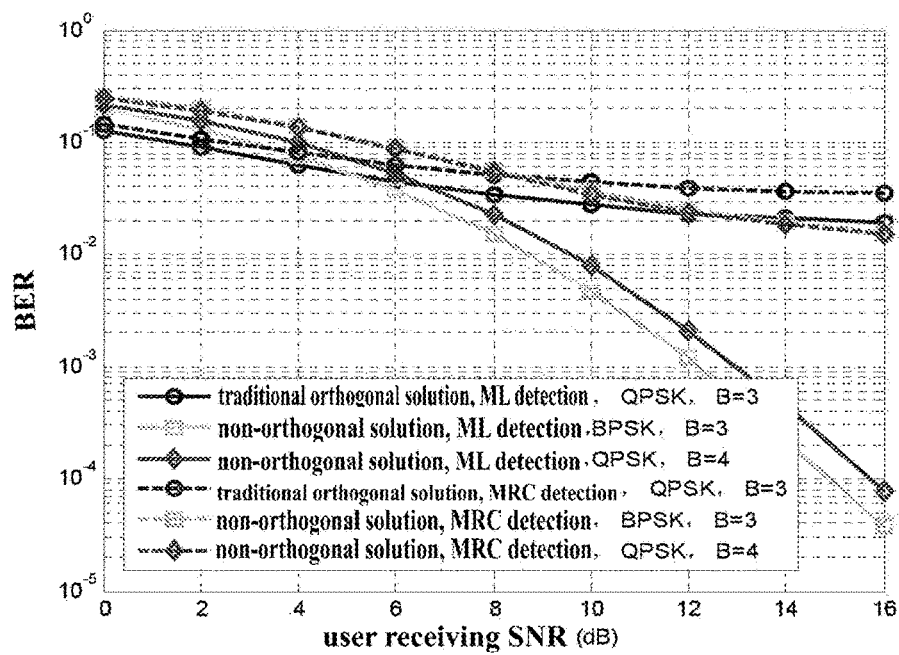

Next, based on the approximate optimal power configuration, the BER performances of the existing non-orthogonal SM scheme (e.g. FIG. 2B) and the orthogonal SM scheme of the present disclosure are compared under different receiving SNRs. The system parameters are set as follows: $B_1$=$B_2$=3, 4, $N_t$=4, K=2, $N_{r1}$=$N_{r2}$=8, $M_1$=$M_2$=2, 4 (i.e., BPSK and QPSK, corresponding to $B_1$=$B_2$=3, 4). In the existing scheme, 4 antennas are divided into 2 groups for spatial modulation for 2 receiving ends, that is, only 1 bit is used for spatial modulation for each receiving end, and in order to provide three-order modulation, QPSK is required for the amplitude phase modulation. For the non-orthogonal spatial modulation scheme, 4 antennas can all be used for spatial modulation for each receiving end, that is, 2 bits are used for spatial modulation for each receiving end, accordingly it just requires BPSK for the phase amplitude modulation can the three-order modulation be provided. As can be seen in FIG. 12B, under the three-order modulation, when the receiving SNR is lower, the BER performance of the scheme herein is similar to that of the existing solution; as the receiving SNR increases, the BER of the scheme herein gets much lower than that of the existing solution. Under the four-order modulation, a similar improvement in BER performance can be seen. It can be seen that the solution of the present disclosure can obtain significant beneficial technical effects especially in the case of a higher SNR.

Scenario with 4 Receiving Ends

For the scenario with four receivers, the number of receiving ends is K=4. The parameters used to determine the approximate optimal power allocation point by grid search are as follows: $N_t=8$, $N_{r1}=N_{r2}=16$, $B_1=B_2=4$, $M_1=M_2=2$ (i.e. BPSK). The power allocation is performed with an objective of making the average BERs of the four receiving ends lowest. It is assumed that the receiving SNRs at the receiving ends are the same. The search load for the approximate optimal solution of power allocation to the four receiving ends is greater, assumption is thus made about the powers between the receiving ends, that is, $p_2=(1-p_1)*p_1$, $p_3=(1-p_1-p_2)*p_1$, $p_4=1-p_1-p_2-p_3$, $\Sigma p_k=1$. By dividing the interval $p_1 \in [0.5, 1]$ into 25 sampling points, considering three cases of different receiving SNRs, i.e.

$$10\log_{10}\frac{\rho_k}{\sigma_k^2} = 5,$$

Figure 12C:
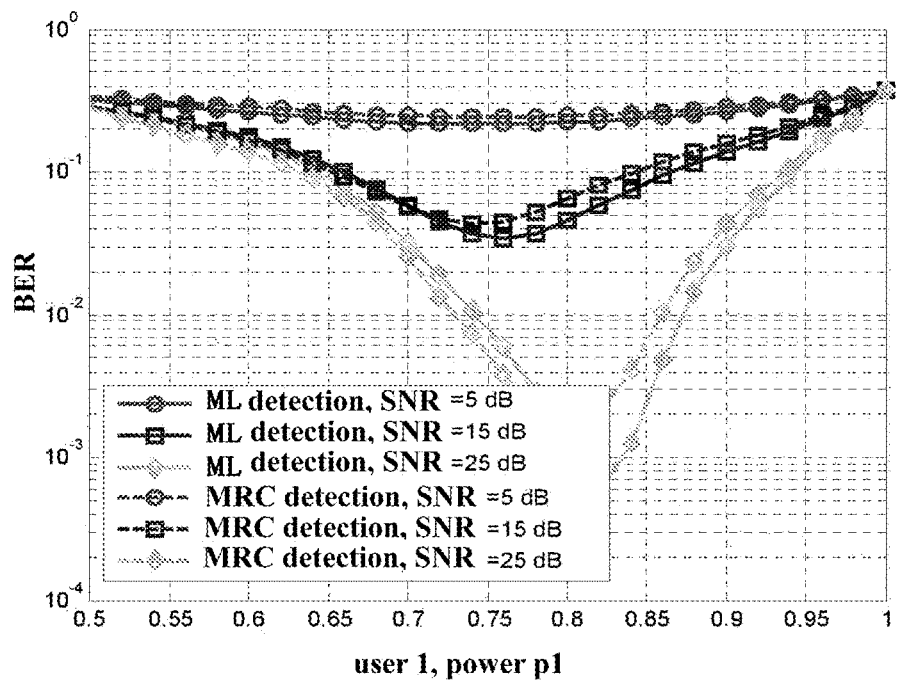
Figure 12D:
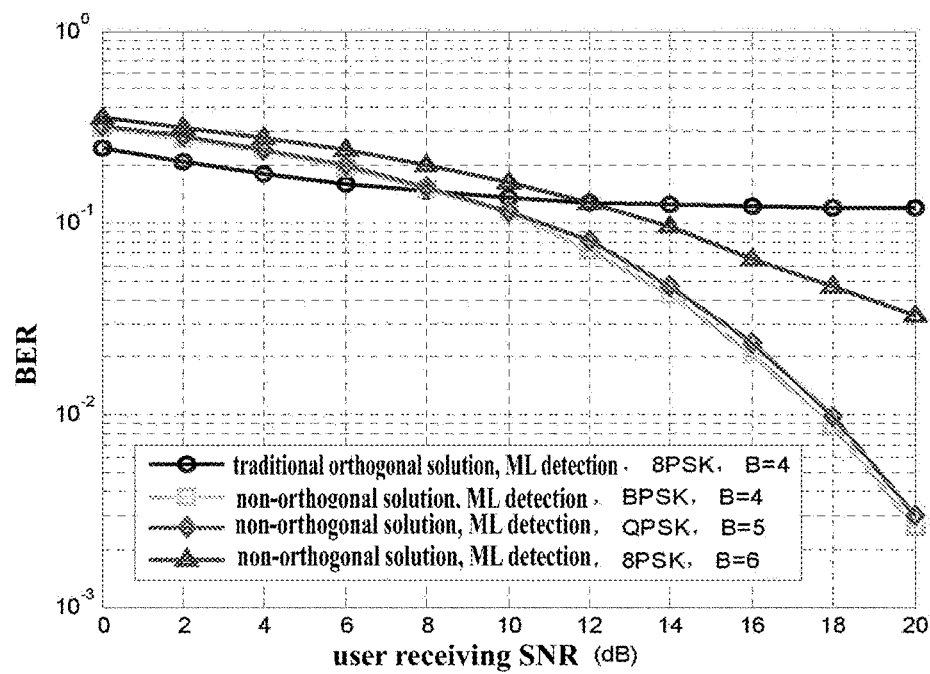

15, 12 dB, grid search is performed for performance of various power allocations. The simulation results are shown in FIG. 12C, and the straight dashed line gives an approximate optimal power allocation configuration.

Next, based on the approximate optimal power configuration, the BER performances of the existing non-orthogonal SM scheme (e.g. FIG. 2B) and the orthogonal SM scheme of the present disclosure are compared under different receiving SNRs. The system parameters are set as follows: $B_1=B_2=4$, 5, 6, $N_t=8$, K=4, $N_{r1}=N_{r2}=16$, $M_1=M_2=2$, 4, 8 (i.e., BPSK, QPSK and 8PSK). As can be seen in FIG. 12B, under the four-order modulation, when the receiving SNR is lower, the BER performance of the scheme herein is similar to that of the existing solution; as the receiving SNR increases, the BER of the scheme herein gets much lower than that of the existing solution. Under the five-order or six-order modulation, a similar improvement in BER performance can be seen. It can be seen that the solution of the present disclosure can obtain significant beneficial technical effects especially in the case of a higher SNR.

Figure 12E:
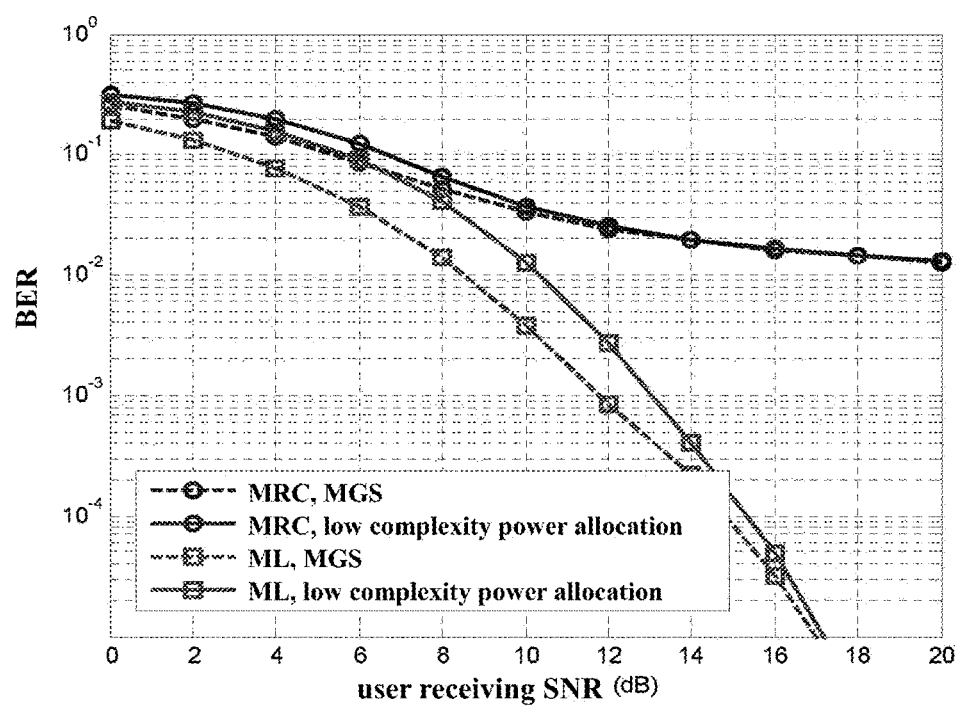
FIG. 12E is a schematic diagram illustrating a comparison of bit error rate performance between low complexity power allocation and multi-dimensional grid search power allocation, according to an embodiment herein.

The performances of the low complexity power allocation and multi-dimensional grid search power allocation method according to the present disclosure will be compared and analyzed with reference to the simulation results shown in FIG. 12E.

The Monte Carlo random method is again used here to perform a simulation experiment. Through $10^6$ random channel simulations, the performance curve of the average bit error rate (BER) relative to the receiving SNR of the receiving antenna is plotted.

The simulation scenarios and parameters in this example are consistent with the scenarios and parameters of the above scenario with two receiving ends. For the multi-dimensional grid search method, the interval $p_1 \in [0.5, 1]$ is divided into 100 sampling points, and the average BER result is simulated for each sampling point. Among the 100 sampling points, the power allocation value corresponding to the sampling point with the lowest average BER is selected as the final result of the grid search. Under the power allocation values obtained by the grid search, the BER performances of the non-orthogonal spatial modulation using the ML and MRC detection algorithms are shown as the two dashed lines in FIG. 12E, respectively. For the low complexity power allocation method, the allocated power value can be directly calculated by formula (11). Under this power value, the BER performances of the non-orthogonal spatial modulation using the ML and MRC detection algorithms are shown by the two solid lines in FIG. 12E, respectively. As shown in FIG. 12E, under the MRC detection algorithm, the performance of the low complexity power allocation method can approach the performance of the multi-dimensional grid search method. Under the ML detection algorithm, when the receiving SNR is lower, there is a performance gap between the low complexity power allocation method and the multi-dimensional grid search method; however, as the receiving SNR is gradually increased, the gap can be gradually reduced. It can be seen that in most cases, the low complexity power allocation method according to the present disclosure can be used instead of the multi-dimensional grid search method.

It should be understood that machine-executable instructions in storage medium and program products according to the embodiments herein can also be configured to perform the methods corresponding to the device embodiments described above, thus contents not described in detail herein can be referred to the corresponding descriptions above, which descriptions are not repeated herein.

Accordingly, the storage medium for storing the above program products and machine executable instructions also falls into scope of the present invention. The storage medium includes, but is not limited to, a floppy disk, an optical disk, a magneto-optical disk, a memory card, a memory stick, and the like.

Figure 13:
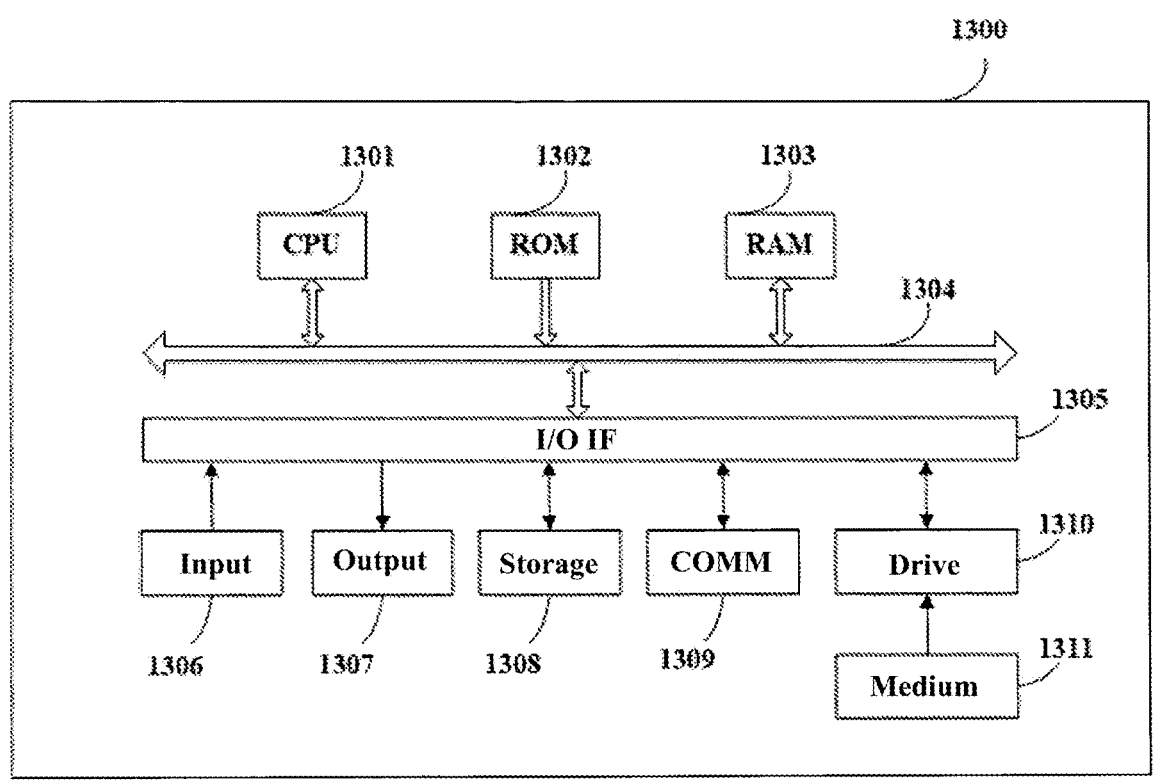
FIG. 13 is a block diagram of example structure of a personal computer which is an information processing device that can be employed in an embodiment herein.

In addition, it should be noted that the above processes and devices can also be implemented by software and/or firmware. In the case of being implemented by software and/or firmware, a program constituting the software is installed from a storage medium or a network to a computer with a dedicated hardware structure, such as the general-purpose personal computer 1300 shown in FIG. 13, which, when is installed with various programs, can execute various functions and so on. FIG. 13 is a block diagram illustrating an example structure of a personal computer which can be employed as an information processing device in the embodiment herein.

In FIG. 13, a central processing unit (CPU) 1301 executes various processes in accordance with a program stored in a read-only memory (ROM) 1302 or a program loaded from a storage section 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. An input/output interface 1305 is also connected to bus 1304.

The following components are connected to the input/output interface 1305: an input section 1306 including a keyboard, a mouse, etc.; an output section 1307 including a display such as a cathode ray tube (CRT), a liquid crystal display (LCD), etc., and a speaker, etc.; the storage section 1308 including a hard disk etc.; and a communication section 1309 including a network interface card such as a LAN card, a modem, etc. The communication section 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory or the like is mounted on the drive 1310 as needed, so that the computer program read therefrom is installed into the storage section 1308 as needed.

In the case where the above processings are implemented by software, a program constituting the software is installed from a network such as the Internet or a storage medium such as the removable medium 1311.

It should be understood by those skilled in the art that the storage medium is not limited to the removable medium 1311 shown in FIG. 13 in which the program is stored and which is distributed separately from the device to provide the program to users. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium can be a ROM 1302, a hard disk included in the storage section 1308, or the like, in which programs are stored and which is distributed to users together with the device containing it.

The technology of the present disclosure can be applied to various products. For example, the base stations mentioned herein can be implemented as any type of evolved Node B (eNB), such as a macro eNB and a small eNB. The small eNB can be an eNB covering a cell smaller than the macro cell, such as a pico eNB, a micro eNB, and a home (femto) eNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at different locations from the body. In addition, various types of terminals which will be described below can each operate as a base station by performing base station functions temporarily or semi-persistently.

For example, the user device mentioned herein can be implemented as a mobile terminal (such as a smartphone, a tablet personal computer (PC), a notebook PC, a portable game terminal, a portable/dongle type mobile router and digital camera) or in-vehicle terminal (such as a car navigation device). The user device can also be implemented as a terminal that performs machine-to-machine (M2M) communication (also referred to as a machine type communication (MTC) terminal). Further, the user device can be a radio communication module (such as an integrated circuit module including a single wafer) installed on each of the above terminals.

Application examples according to the present disclosure will be described below with reference to FIGS. 14 to 17.

Application Example for Base Stations

First Application Example

Figure 14:
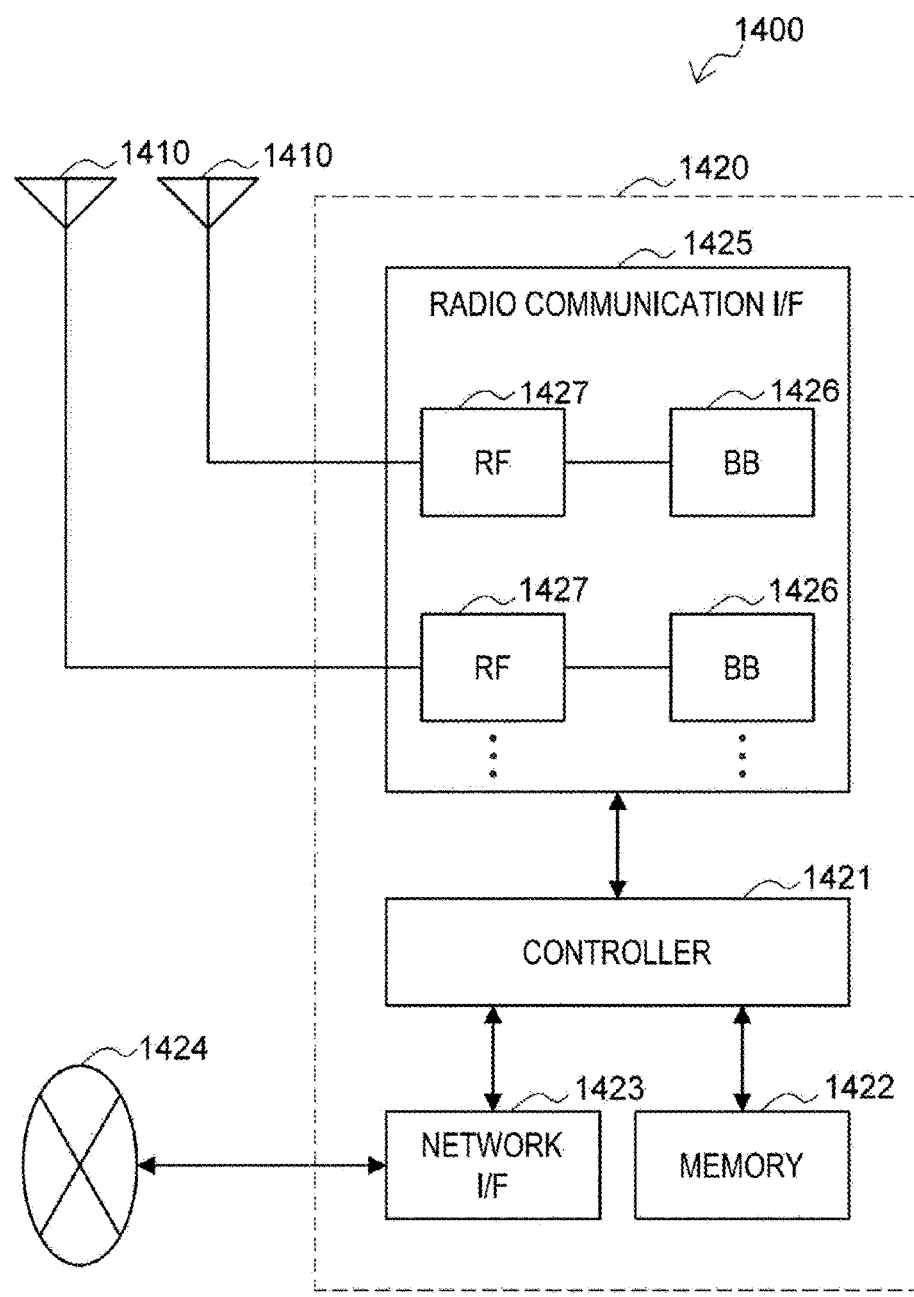
FIG. 14 is a block diagram illustrating a first example of a schematic configuration of an evolved Node B (eNB) to which the technology herein can be applied.

FIG. 14 is a block diagram illustrating a first example of a schematic configuration of an eNB to which the technology herein can be applied. The eNB 1400 includes multiple antennas 1410 and a base station device 1420. The base station device 1420 and each antenna 1410 can be connected to each other via an RF cable. In one implementation, the eNB 1400 (or base station device 1420) herein can correspond to the transmitting end communication device 400 described above. In another implementation, the eNB 1400 (or base station device 1420) can correspond to the receiving end communication device 500 described above.

Each of the antennas 1410 includes a single or multiple antenna elements (such as the multiple antenna elements included in a Multiple Input and Multiple Output (MIMO) antenna), and is used for the base station device 1420 to transmit and receive radio signals. As shown in FIG. 14, the eNB 1400 can include multiple antennas 1410. For example, the multiple antennas 1410 can be compatible with multiple frequency bands used by the eNB 1400.

The base station device 1420 includes a controller 1421, a memory 1422, a network interface 1423, and a radio communication interface 1425.

The controller 1421 can be, for example, a CPU or a DSP, and operates various functions of higher layers of the base station device 1420. For example, controller 1421 generates data packets from data in signals processed by the radio communication interface 1425, and transfers the generated packets via the network interface 1423. The controller 1421 can bundle data from multiple baseband processors to generate bundled packets, and transfer the generated bundled packets. The controller 1421 can have logic functions for performing control such as radio resource control, radio bearer control, mobility management, admission control, and scheduling. These controls can be performed in corporation with an eNB nearby or a core network node. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. The controller 1421 can communicate with the core network node or another eNB via the network interface 1423. In this case, the eNB 1400 and the core network node or the other eNB can be connected to each other through a logical interface such as an S1 interface and an X2 interface. The network interface 1423 can also be a wired communication interface or a radio communication interface for radio backhaul lines. If the network interface 1423 is a radio communication interface, the network interface 1423 can use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the eNB 1400 via the antenna 1410. The radio communication interface 1425 can typically include, for example, a baseband (BB) processor 1426 and a RF circuit 1427. The BB processor 1426 can perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of the controller 1421, the BB processor 1426 can have a part or all of the above-described logical functions. The BB processor 1426 can be a memory that stores a communication control program, or a module that includes a processor configured to execute the program and a related circuit. Updating the program can change the functions of the BB processor 1426. The module can be a card or a blade that is inserted into a slot of the base station device 1420. Alternatively, the module can be a chip that is mounted on the card or the blade. Meanwhile, the RF circuit 1427 can include, for example, a mixer, a filter, and an amplifier, and transmits and receives radio signals via the antenna 1410. Although FIG. 14 illustrates an example in which one RF circuit 1427 is connected to one antenna 1410, the present disclosure is not limited to thereto; rather, one RF circuit 1427 can connect to a plurality of antennas 1410 at the same time.

As illustrated in FIG. 14, the radio communication interface 1425 can include multiple BB processors 1426. For example, the multiple BB processors 1426 can be compatible with multiple frequency bands used by the eNB 1400. As illustrated in FIG. 14, the radio communication interface 1425 can include the multiple RF circuits 1427. For example, the multiple RF circuits 1427 can be compatible with multiple antenna elements. Although FIG. 14 illustrates the example in which the radio communication interface 1425 includes the multiple BB processors 1426 and the multiple RF circuits 1427, the radio communication interface 1425 can also include a single BB processor 1426 or a single RF circuit 1427.

Second Application Example

Figure 15:
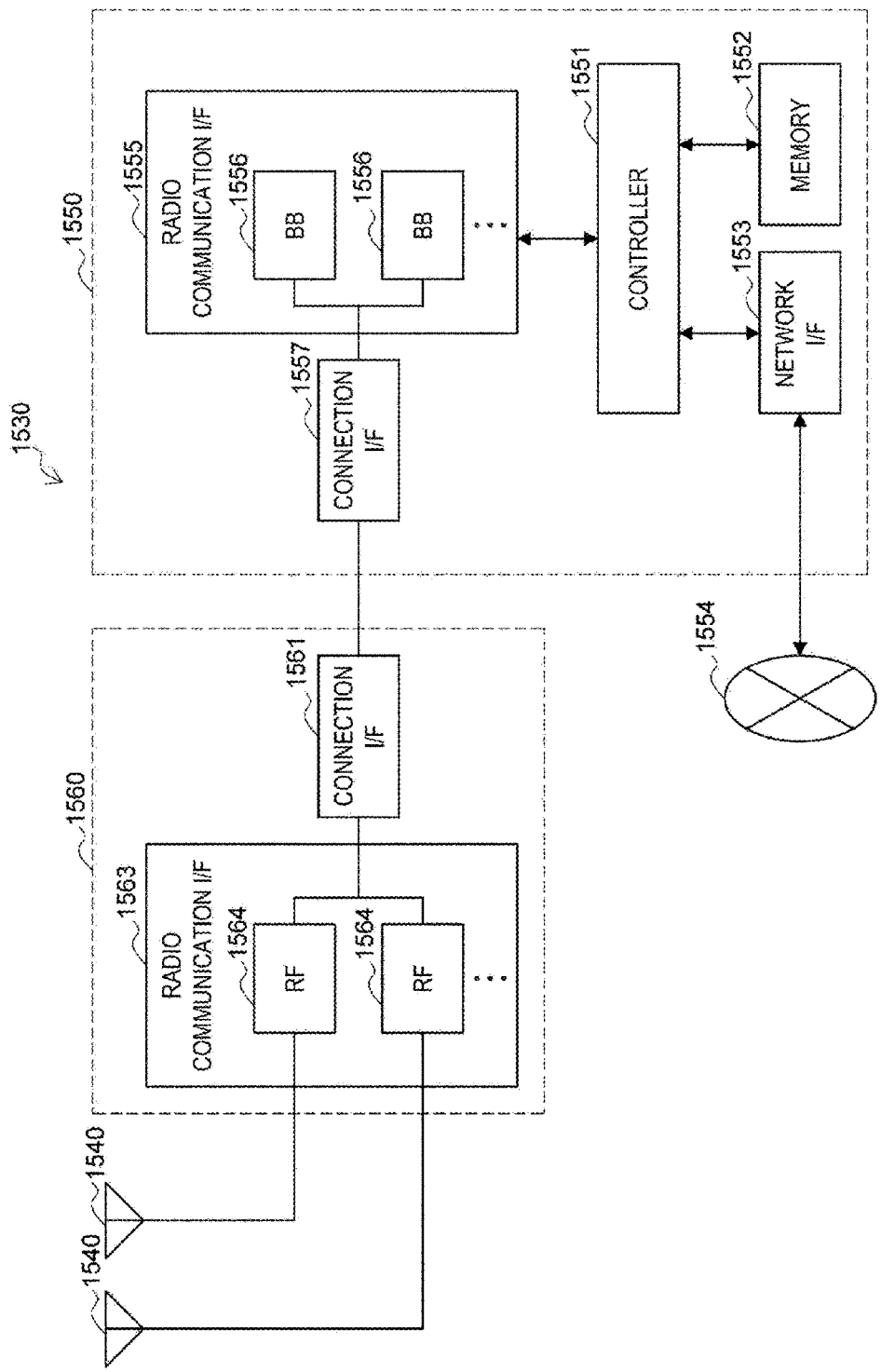
FIG. 15 is a block diagram illustrating a second example of a schematic configuration of an eNB to which the technology herein can be applied.

FIG. 15 is a block diagram illustrating a second example of a schematic configuration of an eNB to which the technology herein can be applied. The eNB 1530 includes multiple antennas 1540, a base station device 1550, and an RRH 1560. The RRH 1560 and each antenna 1540 can be connected to each other via an RF cable. The base station device 1550 and the RRH 1560 can be connected to each other via a high speed line such as a fiber optic cable. In one implementation, the eNB 1530 (or base station device 1550) herein can correspond to the transmitting end communication device 400 described above. In another implementation, the eNB 1530 (or base station device 1550) can correspond to the receiving end communication device 500 described above.

Each of the antennas 1540 includes a single or multiple antenna elements such as multiple antenna elements included in a MIMO antenna and is used for the RRH 1560 to transmit and receive radio signals. The eNB 1530 can include the multiple antennas 1540, as illustrated in FIG. 15. For example, the multiple antennas 1540 can be compatible with multiple frequency bands used by the eNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 can typically include, for example, a BB processor 1556. The BB processor 1556 is the same as the BB processor 1426 described with reference to FIG. 14, except that the BB processor 1556 is connected to the RF circuit 1564 of the RRH 1560 via the connection interface 1557. The radio communication interface 1555 can include the multiple BB processors 1556, as illustrated in FIG. 15. For example, the multiple BB processors 1556 can be compatible with multiple frequency bands used by the eNB 1530. Although FIG. 15 illustrates the example in which the radio communication interface 1555 includes the multiple BB processors 1556, the radio communication interface 1555 can also include a single BB processor 1556.

The connection interface 1557 is an interface for connecting the base station device 1550 (the radio communication interface 1555) to the RRH 1560. The connection interface 1557 can also be a communication module for communication in the the above-described high speed line that connects the base station device 1550 (the radio communication interface 1555) to the RRH 1560.

The RRH 1560 includes a connection interface 1561 and a radio communication interface 1563.

The connection interface 1561 is an interface for connecting the RRH 1560 (the radio communication interface 1563) to the base station device 1550. The connection interface 1561 can also be a communication module for communication in the above-described high speed line.

The radio communication interface 1563 transmits and receives radio signals via the antenna 1540. The radio communication interface 1563 can typically include, for example, the RF circuitry 1564. The RF circuit 1564 can include, for example, a mixer, a filter, and an amplifier, and transmits and receives radio signals via the antenna 1540. Although FIG. 15 illustrates the example in which one RF circuit 1564 is connected to one antenna 1540, the present disclosure is not limited to thereto; rather, one RF circuit 1564 can connect to multiple antennas 1540 at the same time.

The radio communication interface 1563 can include multiple RF circuits 1564, as illustrated in FIG. 15. For example, the multiple RF circuits 1564 can support multiple antenna elements. Although FIG. 15 illustrates the example in which the radio communication interface 1563 includes the multiple RF circuits 1564, the radio communication interface 1563 can also include a single RF circuit 1564.

Applications Examples for User Devices

First Application Example

Figure 16:
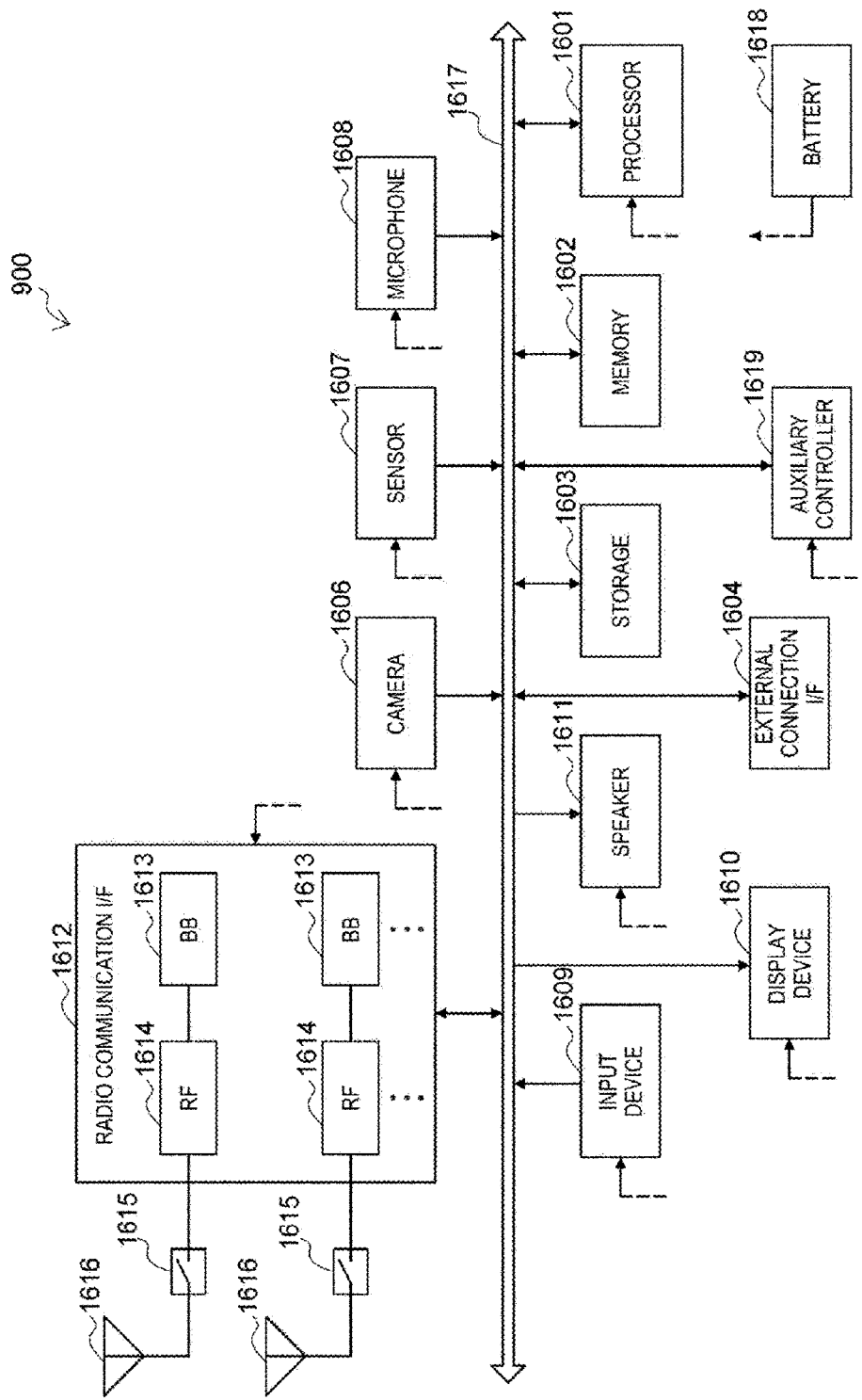
FIG. 16 is a block diagram illustrating an example of a schematic configuration of a smartphone to which the technology herein can be applied.

FIG. 16 is a block diagram illustrating an example of a schematic configuration of a smartphone 1600 to which the technology herein can be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, the smartphone 1600 (or the processor 1601) herein can correspond to the transmitting end communication device 400 described above. In another implementation, the smartphone 1600 (or the processor 1601) herein can correspond to the receiving end communication device 500 described above.

The processor 1601 can be, for example, a CPU or a system on chip (SoC), and controls functions of an application layer and the other layers of the smartphone 1600. The memory 1602 includes RAM and ROM, and stores a program that is executed by the processor 1601, and data. The storage 1603 can include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 can include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 can typically include, for example, a BB processor 1613 and an RF circuitry 1614. The BB processor 1613 can perform, for example, encoding/decoding, modulation/demodulation, and multiplexing/demultiplexing, and performs various types of signal processing for radio communication. Meanwhile, the RF circuit 1614 can include, for example, a mixer, a filter, and an amplifier, and transmits and receives radio signals via the antenna 1616. The radio communication interface 1612 can be a one chip module that integrates the BB processor 1613 and the RF circuit 1614 thereon. The radio communication interface 1612 can include multiple BB processors 1613 and multiple RF circuits 1614, as illustrated in FIG. 16. Although FIG. 16 illustrates the example in which the radio communication interface 1612 includes the multiple BB processors 1613 and multiple RF circuits 1614, the radio communication interface 1612 can also include a single BB processor 1613 or a single RF circuit 1614.

Furthermore, in addition to the cellular communication scheme, the radio communication interface 1612 can support additional types of radio communication schemes, such as short-range wireless communication schemes, near field communication schemes, and wireless local area network (LAN) schemes. In this situation, the radio communication interface 1612 can include the BB processor 1613 and the RF circuitry 1614 for each radio communication scheme.

Each of the antenna switches 1615 switches destinations to connect the antenna 1616 among multiple circuits (such as circuits for different radio communication schemes) included in the radio communication interface 1612.

Each of the antennas 1616 includes a single antenna element or multiple antenna elements (such as multiple antenna elements included in a MIMO antenna) and is used for the radio communication interface 1612 to transmit and receive radio signals. The smartphone 1600 can include multiple antennas 1616, as illustrated in FIG. 16. Although FIG. 16 illustrates the example in which the smartphone 1600 includes multiple antennas 1616, the smartphone 1600 can also include a single antenna 1616.

Furthermore, the smartphone 1600 can include the antennas 1616 for each radio communication scheme. In this situation, the antenna switch 1615 can be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to modules of the smartphone 1600 illustrated in FIG. 16 via feeder lines, which are partially shown as dashed lines in the figure. The auxiliary controller 1619 operates minimum necessary functions of the smartphone 1600, for example, in a sleep mode.

Second Application Example

Figure 17:
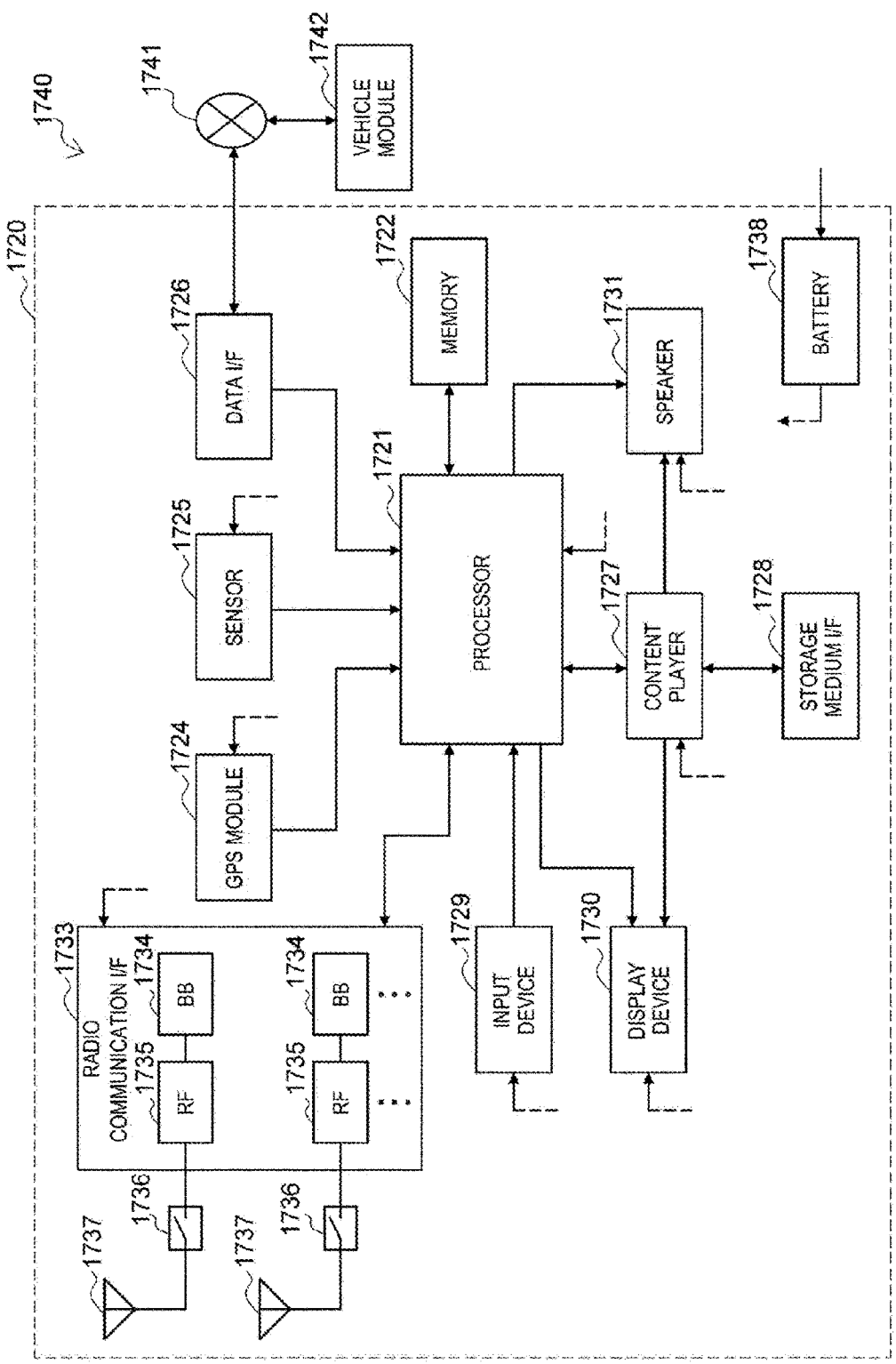
FIG. 17 is a block diagram illustrating an example of a schematic configuration of a automobile navigation device to which the technology herein can be applied.

FIG. 17 is a block diagram illustrating an example of a schematic configuration of a car navigation device 1720 to which the technology herein can be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, the car navigation device 1720 (or processor 1721) herein can correspond to the transmitting end communication device 400 described above. In another implementation, the car navigation device 1720 (or processor 1721) can correspond to the receiving end communication device 500 described above.

The processor 1721 can be, for example, a CPU or a SoC, and controls a navigation function and other functions of the car navigation device 1720. The memory 1722 includes RAM and ROM, and stores a program that is executed by the processor 1721 and data.

The GPS module 1724 uses GPS signals received from a GPS satellite to measure a position, such as latitude, longitude, and altitude, of the car navigation device 1720. The sensor 1725 can include a group of sensors such as a gyro sensor, a geomagnetic sensor, and an air pressure sensor. The data interface 1726 is connected to, for example, an in-vehicle network 1741 via a terminal (not shown), and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 can typically include, for example, a BB processor 1734 and an RF circuit 1735. The BB processor 1734 can perform, for example, encoding/decoding, modulation/demodulation, and multiplexing/demultiplexing, and performs various types of signal processing for radio communication. Meanwhile, the RF circuit 1735 can include, for example, a mixer, a filter, and an amplifier, and transmits and receives radio signals via the antenna 1737. The radio communication interface 1733 can also be a one chip module which integrates the BB processor 1734 and the RF circuit 1735 thereon. The radio communication interface 1733 can include multiple BB processors 1734 and multiple RF circuits 1735, as illustrated in FIG. 17.

Although FIG. 17 illustrates the example in which the radio communication interface 1733 includes multiple BB processors 1734 and multiple RF circuits 1735, the radio communication interface 1733 can also include a single BB processor 1734 or a single RF circuit 1735.

Furthermore, in addition to the cellular communication scheme, the radio communication interface 1733 can support another types of radio communication schemes such as a short-range wireless communication scheme, a near-field communication scheme, and a wireless LAN scheme. In this situation, the radio communication interface 1733 can include the BB processor 1734 and the RF circuit 1735 for each radio communication scheme.

Each of the antenna switches 1736 switches destinations to connect the antenna 1737 among multiple circuits (such as circuits for different radio communication schemes) included in the radio communication interface 1733.

Each of the antennas 1737 includes a single antenna element or multiple antenna elements, such as the multiple antenna elements included in a MIMO antenna, and is used for the radio communication interface 1733 to transmit and receive radio signals. The car navigation device 1720 can include multiple antennas 1737, as illustrated in FIG. 17. Although FIG. 17 illustrates the example in which the car navigation device 1720 includes multiple antennas 1737, the car navigation device 1720 can include a single antenna 1737.

Furthermore, the car navigation device 1720 can include the antenna 1737 for each radio communication scheme. In this situation, the antenna switch 1736 can be omitted from the configuration of the car navigation device 1720.

The battery 1738 supplies power to modules of the car navigation device 1720 illustrated in FIG. 17 via feeder lines that are partially shown as dashed lines in the figure. The battery 1738 accumulates power supplied from the vehicle.

The technology herein can also be implemented as an in-vehicle system (or vehicle) 1740 including one or more modules of the car navigation device 1720, an in-vehicle network 1741, and a vehicle module 1742. The vehicle module 1742 generates vehicle data such as vehicle speed, engine speed, and faults information, and outputs the generated data to the in-vehicle network 1741.

Although the illustrative embodiments of the present disclosure have been described with reference to the accompanying drawings, the present disclosure is, of course, not limited to the above examples. Those skilled in the art can achieve various adaptions and modifications within the scope of the appended claims, and it will be appreciated that these adaptions and modifications, of course, fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In additions, one of the above functions can be implemented by multiple units. Needless to say, such configurations fall within the the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. A communication device, comprising:
a plurality of antennas configured to communicate with a plurality of receivers during a plurality of time slices,
wherein, for each of the plurality of receivers, each of the plurality of antennas is a candidate to transmit signals to the receiver during a particular time slice of the plurality of time slices,
wherein, for each of the plurality of receivers, only one particular antenna of the plurality of antennas is selected to transmit signals to the receiver during the particular time slice, and
wherein the particular antenna is selected to transmit signals to more than one receiver of the plurality of receivers during the particular time slice.

2. The communication device of claim 1, wherein the particular antenna is selected using a mapping rule.

3. The communication device of claim 2, wherein the mapping rule maps a sequence number of a first channel to first information bits.

4. The communication device of claim 3, wherein the first information bits are transmitted to the receiver by the particular antenna during the particular time slice.

5. The communication device of claim 1, wherein the communication device is configured to allocate a transmission power to each of the plurality of receivers.

6. A communication method for a communication device comprising a plurality of antennas, the method comprising the steps of:
communicating with a plurality of receivers during a plurality of time slices,
wherein, for each of the plurality of receivers, each of the plurality of antennas is a candidate to transmit signals to the receiver during a particular time slice of the plurality of time slices,
wherein, for each of the plurality of receivers, only one particular antenna of the plurality of antennas is selected to transmit signals to the receiver during the particular time slice, and
wherein the particular antenna is selected to transmit signals to more than one receiver of the plurality of receivers during the particular time slice.

7. The communication method of claim 6, wherein the particular antenna is selected using a mapping rule.

8. The communication method of claim 7, wherein the mapping rule maps a sequence number of a first channel to first information bits.

9. The communication method of claim 8, wherein the first information bits are transmitted to the receiver by the particular antenna during the particular time slice.

10. The communication method of claim 6, wherein the communication device is configured to allocate a transmission power to each of the plurality of receivers.

\* \* \* \* \*